United States Patent
Mueck et al.

(10) Patent No.: US 10,785,783 B2
(45) Date of Patent: Sep. 22, 2020

(54) METHODS AND APPARATUS FOR PARTIAL INTERFERENCE REDUCTION WITHIN WIRELESS NETWORKS

(71) Applicant: APPLE INC., Cupertino, CA (US)

(72) Inventors: Markus Mueck, Unterhaching (DE); Maik Bienas, Braunschweig (DE); Andreas Schmidt, Braunschweig (DE)

(73) Assignee: Apple Inc., Cupertino, CA (US)

(*) Notice: Subject to any disclaimer, the term of this patent is extended or adjusted under 35 U.S.C. 154(b) by 56 days.

(21) Appl. No.: 14/733,606

(22) Filed: Jun. 8, 2015

(65) Prior Publication Data
US 2015/0305055 A1   Oct. 22, 2015

Related U.S. Application Data

(63) Continuation of application No. 13/657,726, filed on Oct. 22, 2012, now Pat. No. 9,054,791, which is a
(Continued)

(51) Int. Cl.
| | |
|---|---|
| H04K 1/10 | (2006.01) |
| H04L 27/28 | (2006.01) |
| H04W 72/12 | (2009.01) |
| H04J 11/00 | (2006.01) |
| H04L 5/00 | (2006.01) |

(Continued)

(52) U.S. Cl.
CPC ........ H04W 72/1226 (2013.01); H04B 15/00 (2013.01); H04J 11/0033 (2013.01); H04L 5/0007 (2013.01); H04L 5/0016 (2013.01); H04L 5/0048 (2013.01); H04L 25/4975 (2013.01); H04W 72/082 (2013.01); H04W 72/1263 (2013.01); *H04B 2215/062* (2013.01)

(58) Field of Classification Search
CPC ........... H04W 72/1226; H04W 72/082; H04W 72/1263; H04W 16/10; H04B 2215/062; H04B 15/00; H04J 11/0033; H04L 5/0007; H04L 5/0016; H04L 5/0048; H04L 25/4975
USPC ........ 375/260, 346, 296, 285; 370/330, 342, 370/329
See application file for complete search history.

(56) References Cited

U.S. PATENT DOCUMENTS

| | | | | |
|---|---|---|---|---|
| 2011/0110311 A1* | 5/2011 | Krause | .................. | H04W 16/10 370/329 |
| 2011/0134867 A1* | 6/2011 | Lee | ....................... | H04L 5/0023 370/329 |

* cited by examiner

*Primary Examiner* — Phuong Phu
(74) *Attorney, Agent, or Firm* — Fay Kaplun & Marcin, LLP

(57) ABSTRACT

Methods and apparatus that enable one or more wireless networks to minimize inter-cellular interference (ICI) at a receiver. In one embodiment, the network comprises an OFDM-based cellular network, and the method comprises utilizing a priori knowledge of non-data portions of signals from multiple base stations in order to schedule transmissions. In one variant, these non-data portions comprise pilot tones; the pilot tones can be scheduled onto various time-frequency resources of the network so as to minimize ICI. The mobility context of the receiver can also be used as a basis for dynamically adjusting the pilot tone density. In another variant, precoding (e.g., Tomlinson-Harashima precoding) can be applied to "shape" the non-data portions of the transmitted signals so as to mitigate ICI. In yet other variants, frame preambles and learning sequences are used as the basis for invoking selective transmission time shifts across the potentially interfering base stations so as to minimize ICI.

20 Claims, 15 Drawing Sheets

Related U.S. Application Data continuation of application No. 12/286,659, filed on Sep. 30, 2008, now Pat. No. 8,295,395.

(51) Int. Cl.
*H04L 25/497* (2006.01)
*H04B 15/00* (2006.01)
*H04W 72/08* (2009.01)

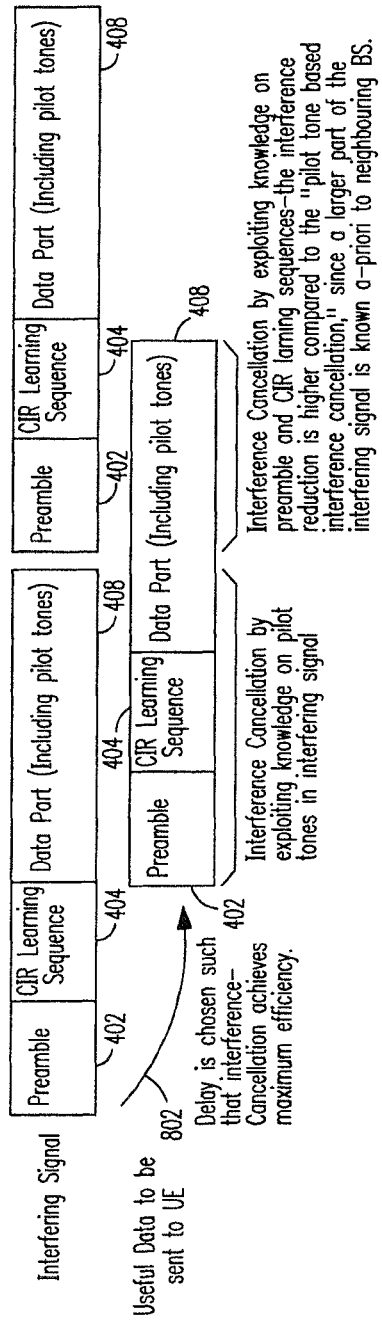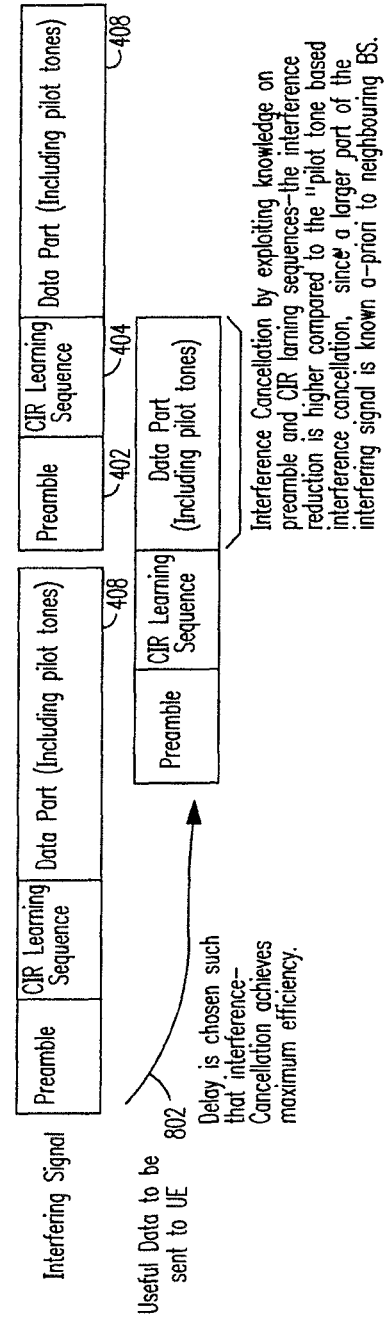
FIG. 8A
FIG. 8B

METHODS AND APPARATUS FOR PARTIAL INTERFERENCE REDUCTION WITHIN WIRELESS NETWORKS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communications. More particularly, in one exemplary aspect, the present invention is directed to cooperative operation of a base station network (or even multiple heterogeneous networks), wherein base station timing, precoding methods, and/or simplified communication techniques are leveraged to improve spectral efficiency (including time-frequency resource reuse).

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for, inter alia, European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in future, namely to speeds on the order of 300 Mbps in the downlink transmission direction and 75 Mbps in the uplink transmission direction.

The current LTE specification describes several multiple access methods. For the downlink transmission direction, OFDMA (Orthogonal Frequency Division Multiple Access) in combination with TDMA (Time Division Multiple Access) will be used. Uplink data transmission is based on SC-FDMA (Single Carrier Frequency Division Multiple Access) in combination with TDMA. Further, LTE is expected to support full-duplex FDD, half-duplex FDD and TDD (time division duplexing).

Basic Multiple Access Methods—

FIGS. 1A-1D further illustrate basic multiple access methods well understood in the wireless transmission arts. In these Figures, it will be recognized that time increases in the direction of a time axis (t), and frequency increases in the direction of a frequency axis (F).

FIG. 1A comprises a first time-frequency diagram illustrating a TDMA (time division multiple access) system. In TDMA, each mobile radio terminal may use the whole frequency band provided for the usage by the mobile radio terminals. However, for each mobile radio device, only a predefined transmission time interval (TTI) is allocated in which the mobile radio device may send and receive useful data. During a transmission time interval 102, only one mobile radio device is active in a radio cell. In TDMA, the number of users that the network can support is equal to the number of TTIs or time slots that are available. This can produce a hard limit (or so-called "non-graceful" degradation), since when the number of users exceeds the number of slots, the system becomes overloaded and the added user cannot be serviced.

FIG. 1B comprises a second time-frequency diagram illustrating a FDMA (frequency division multiple access) system. In FDMA, each mobile radio device may freely use the time domain, but only a predefined (narrow) frequency band 104 within the entire frequency band available for sending and receiving useful data. In the narrow frequency band, only one mobile radio device is active in the radio cell at any given time. In FDMA, the number of users that the network can support is equal to the number of frequency bands which are available throughout a given frequency spectrum, and hence FDMA networks experience service limitations similar to those described above for TDMA systems.

FIG. 1C comprises a third time-frequency diagram illustrating a CDMA (code division multiple access) system. In CDMA (a sub-species of so-called "direct sequence" or DS systems), each mobile radio terminal may send and receive useful data during any time period, and may use the entire available frequency band. In order to avoid interference between the data sent by different senders, each mobile radio device is allocated a binary (pn or "pseudo-noise") code pattern 106. The code patterns which are allocated to the different mobile radio terminals are ideally orthogonal, and data sent by a mobile radio terminal or to be received by the mobile radio terminal is coded ("spread") by the code pattern allocated to the mobile radio terminal. In CDMA, the number of users that the network can support is directly related to the number of orthogonal spreading codes which are available; hence, a more "graceful" degradation of service is experienced as the network reaches or exceeds capacity. CDMA has the property that the higher the number of users on the network, the more likely the users will interfere with one another. Accordingly, code distribution and power control are critical.

In certain modes of CDMA operation, variable data rates may be supported by assigning various length spreading codes (a high data rate stream requires a shorter length spreading code, which also limits the number of orthogonal codes available to other users).

FIG. 1D illustrates OFDMA (orthogonal frequency division multiple access), which is a special case of FDMA. OFDMA is a multiple carrier method in which the entire frequency band having a bandwidth B is subdivided into M orthogonal sub-carriers 108. Thus, there are M (narrow) frequency bands each with a bandwidth of F=B/M. In OFDMA, a data stream to be sent is divided over a multiplicity of sub-carriers, and is transmitted (generally) in parallel. The data rate of each sub-carrier is accordingly lower than the overall data rate. For each mobile radio terminal, a defined number of sub-carriers are allocated for data transmission. For OFDMA, the number of maximum users that the network can support is the multiple of the orthogonal sub-carriers multiplied by the number of available transmission time intervals. A chief advantage of OFDMA's flexible time-frequency resource allocation, over e.g., CDMA's flexible code allocation, is a higher spectral efficiency (i.e., more bits per unit time per unit of frequency bandwidth).

Existing Wireless Systems and Interference Reduction Approaches—

FIG. 2 illustrates a typical cellular system 200. The Access Network comprises a plurality of base station towers 202 that are set at fixed geographic locations (although some networks do utilize moveable base stations or femtocells). Their wireless coverage is indicated by the dotted areas 204. A Core Network (which is not shown) includes a number of different components and logical entities, and governs the operation of the base stations. A mobile station 206 is being served by one of the base stations and can switch between them via a well-known handoff procedure. The base stations are connected in point-to-point communications to facilitate network management. In the exemplary case of a 3GPP LTE (Evolved UMTS) system, eNodeBs (i.e. base stations) serve UEs (i.e. mobile stations). An X2 interface connects the eNodeBs of the E-UTRAN (Evolved UMTS Radio Access Network). The X2 interface is a pre-defined communication pathway between adjacent eNodeBs to assist in handoffs and Radio Resource Management (RRM).

FIG. 2A illustrates one exemplary OFDMA cellular system 200 useful in implementing a 3GPP LTE compliant cellular network, comprising 3 base stations (BS) 202A, 202B, and 202C having wireless coverage ranges of 204A, 204B and 204C, respectively. As shown, BS 202A is transmitting to UE 206A, BS 202B is transmitting to UE 202B, and BS 202C is transmitting to UE 206C. Unfortunately, UE 202A is operating in a region of transmission overlap, and is thus receiving transmissions intended for UE202B and UE 202C. This unintentional transmission noise due to base station overlap is commonly referred to as Inter-Cell Interference (ICI). Unlike other forms of truly random noise (e.g., Additive White Gaussian Noise or AWGN caused by thermal noise, etc.), ICI is predictable and deterministic. Therefore, improved methods for managing and obviating ICI for cellular networks are desired.

Several solutions have been contemplated to reduce various types of Inter-Cell Interference. For example, U.S. Pat. No. 6,047,165 to Wright et al. issued Apr. 4, 2000 and entitled "Wireless, frequency-agile spread spectrum ground link-based aircraft data communication system" discloses a flight information communication system having a plurality of RF direct sequence spread spectrum ground data links that link respective aircraft-resident subsystems, in each of which a copy of its flight performance data is stored, with airport-located subsystems. To mitigate interference, a frequency management scheme is employed which initially determines the optimum operating frequency for the GDL link, and automatically changes to a better quality frequency channel when the currently established channel suffers an impairment.

U.S. Pat. No. 6,714,775 to Miller issued Mar. 30, 2004 and entitled "Interference canceller" discloses an interference canceller, wherein the interference canceller includes an input receiving an input composite signal, a reference circuit, and a cancellation circuit. The interference canceller derives its own reference signal. Internal derivation of the reference signal is accomplished by suppressing the desired signal included within a sampled quantum of a composite signal. The resultant reference signal is a likeness of the interfering signals; containing substantially only the interference signal. The internally produced reference signal is amplitude and phase adjusted in a time-continuous fashion and summed with the composite signal in the cancellation circuit. The output of the cancellation circuit contains the desired signal and a substantially suppressed interference signal.

U.S. Pat. No. 7,023,938 to Kapoor et al. issued Apr. 4, 2006 and entitled "Receiver for discrete multi-tone modulated signals having window function" discloses a receiver for improving the performance of conventional Discrete Multi-tone Modulation (DMT) based Asymmetric Digital Subscriber Line (ADSL) modems, in the presence of noise and/or interference. A demodulator having an FFT followed by a single-tap-per-bin frequency-domain equalizer is augmented by an additional data-path utilizing windowing or pulse shaping. Windowing is done independently for each symbol over the orthogonality interval and efficiently in the time domain or frequency domain. A decision feedback equalizer at the output of the windowed data-path cancels inter-bin-interference created by windowing.

United States Patent Publication No. 20020002063 to Miyamoto et al. published Jan. 3, 2002 and entitled "Base station control equipment, radio base station equipment, radio terminal equipment, and mobile communication system" discloses base station control equipment, radio base station equipment and radio terminal equipment that together constitute a mobile communication system. These base station control equipment, radio base station equipment and radio terminal equipment update transmitting power of a radio channel allotted to a new visit-zone to a greater and suitable value in time sequence. Therefore, a mobile communication system can keep speech quality of a completed call and transmission quality at higher levels, can improve the number of radio channels that can be formed in parallel in a common frequency band (system capacity) or an information content of information that can be transmitted in parallel with desired transmission quality, and can improve utilization efficiency of a radio frequency.

United States Patent Publication No. 20040022210 to Frank et al. published Feb. 5, 2004 and entitled "Cooperative transceiving between wireless interface devices of a host device" discloses a method and/or apparatus for cooperative transceiving between wireless interface devices of a host device that includes processing that begins by providing an indication of receiving an inbound packet from one wireless interface device (e.g., Bluetooth compliant radio transceiver, IEEE 802.11 compliant radio transceiver, etc.) to another. The wireless interface device receiving the indication processes the indication and, based on the processing, transmits an outbound packet in accordance with the processing of the indication. For example, the wireless interface device receiving the indication may delay transmission until the other wireless interface device has received the packet, or, if transmission of the packet would not interfere with the receiving of the packet by the other wireless interface device, the wireless interface device receiving the indication would transmit its packet.

United States Patent Publication No. 20070155336 to Nam et al. published Jul. 5, 2007 and entitled "Apparatus and method for eliminating multi-user interference" discloses an apparatus and method for eliminating multi-user interference in a codebook-based beamforming system. A transmitter for providing a service to multi-users in the codebook-based beamforming system includes a beamformer for generating beamformed user signals by multiplying transmit data of users, to whom the service is to be provided, by corresponding weighting factor vectors using feedback information; a null space generator for generating a null space matrix orthogonal to weighting factor vectors of other users; and a projector for projecting the beamformed user signals on the corresponding null space matrix and transmitting the resulting signals through a plurality of antennas. Because the multi-user signals can maintain orthogonality, the performance degradation caused by the multi-user interference can be prevented.

WIPO Publication No. WO/2007/021153 to Lee et al. published Feb. 22, 2007 and entitled "Virtual multiple antenna method for OFDM system and OFDM-based cellular system" discloses a virtual multi-antenna method for an orthogonal frequency division multiplexing (OFDM) system and an OFDM-based cellular system. The virtual multi-antenna method includes grouping sub-carriers in a frequency domain of an OFDM symbol and generating at least one group including G sub-carriers; and regarding the G sub-carriers included in the at least one group as multiple channels used in a multi-antenna technique and virtually applying the multi-antenna technique to the transmission and reception of the OFDM symbol. The virtual multi-antenna method can effectively reduce an interference signal and obtain the effects of a spatial division multiple access (SDMA) technique without physically using multiple antennas.

WIPO Publication No. WO/2007/075107 to Taubin et al. published Jul. 5, 2007 and entitled "Autoregressive moving average modeling for feedforward and feedback Tomlinson-Harashima precoder filters" discloses apparatus and methods for providing a Tomlinson-Harashima precoder scheme in which a feedback filter may be constructed to match an approximated feedforward filter, where the feedforward filter is approximated using autoregressive moving average modeling.

WIPO Publication No. WO/2007/037715 entitled "Precoder Design For Different Channel Lengths" discloses a precoder e.g. Tomlinson-Harashima precoder, parameters constructing method, that involves forming set of values of precoder constructions for preset channel length, where values are obtained from applying transmission quality criterion. The method involves forming a set of values for a set of precoder constructions for a predetermined channel length. The values are obtained from applying a transmission quality criterion to each precoder construction for varying channel lengths, where a transmission quality criterion includes using a mean square error at a feed forward filter output of a precoder e.g. Tomlinson-Harashima precoder. The precoder constructions are generated to cover a distance range, where the distance range is divided into a length equal to predetermined channel lengths.

While the foregoing prior art techniques for reducing the effects of ICI disclose careful frequency-planning, the usage of available frequency bands is organized such that neighboring BSs are not concurrently using the same frequency bands. This may require a corresponding limitation on the sub-carrier allocation in an OFDMA-based system (such as 3GPP LTE, WiMAX, etc.). Other possible methods for frequency planning and reuse may require frequency hopping pattern definitions, or other similar limiting or avoidance techniques. One salient drawback associated with such frequency planning techniques is reduced spectral inefficiency. Specifically, each BS must only operate within a fraction of its available band at any given time, in order to minimize neighboring ICI effects. Accordingly, a desirable solution would enable BS operation within its entire available spectrum, while still ensuring that the interference imparted to neighboring cells is minimized.

CIR and "Precoding"—

Alternatively, other prior art techniques may compensate to some degree for certain forms of interference to enable limited suppression of corruption, and suffer from the disability of inter alia that channel characteristics are often imperfectly known. Recall that transmission corruption is introduced by unwanted channel noise, of which some causes are random (e.g. thermal noise, weather induced fading, etc) and others are predictable (such as ICI, and self-induced interference). One characterization of the effects of channel corruption is termed Channel Impulse Response (CIR). A CIR represents the effects on an "imaginary" impulse transmitted from one or more transmitters in a "vacuum", and their corresponding measured incident response at the receiver antenna. FIG. 2B illustrates an imaginary BS 202, which is the superposition of three (3) "real" 135 202A, 202B, and 202C. Each BS (202A, 202B, 202C) has a corresponding CIR at the UE. However, the aggregate CIR 208 is actually perceived at UE 206, as the UE cannot distinguish which CIR belongs to which of the "real" base stations.

In these interference suppression schemes, UEs are expected to apply interference reduction algorithms to remove ICI. FIG. 3 illustrates one typical method of implementing interference reduction at the UE. The UE estimates the interfering signals 302, and then reconstructs a "guessed" interfering signal and subtracts it from the received signal 304. If the UE has multiple interfering signals, it iterates through each "guessed" signal. Once all the interfering signals have been estimated and removed, the desired useful signal is decoded in step 306. UE-based interference suppression techniques generally work well if the UE is able to obtain correct estimates of the interfering signals, and accurate CIR models.

In practice, the UE must estimate the channel corruption based on its received signal. The UE is never given a "golden" or error-free starting point from which it is to deduce channel corruption. Therefore, estimation errors commonly occur during initial estimates of the CIR, and are propagated throughout subsequent calculations. If the UE has misestimated the level or type of interference, then the suppression stage 304 may not reduce the overall interference level. Furthermore, with large enough estimation errors, the suppression stage may actually degrade performance. Thus, an ideal solution would minimize potentially fallible estimation techniques to reduce interference.

In one alternative prior art solution, interference suppression techniques may be performed at the BS. Such approaches include so-called "Tomlinson-Harashima Precoding (THP)" techniques described in, inter alia, *IEEE International Conference Volume* 3 to Kusume et al. published May 2005 and entitled "Efficient Tomlinson-Harashima precoding for spatial multiplexing on flat MIMO channel", and *ITG Conference on Source and Channel Coding* to Fischer et al. published January 2002 entitled "Space-Time Transmission using Tomlinson-Harashima Precoding", each of the foregoing being incorporated herein by reference in its entirety.

Unfortunately, extant THP methods have several stringent requirements including: (i) that each BS must know the CIR of all radio channels (i.e., CIRs from all BS to all UEs), and (ii) that each BS must know all the data that the other BS will transmit in the future. Further, each BS must be perfectly synchronized. If all of these requirements are satisfied, then THP can reshape the transmitted signals such that, at a given UE location, the unwanted noise destructively interferes with itself, creating a noise-free channel. Unlike UE-based suppression schemes, each THP BS perfectly "knows" the actual transmitted signal, and does not introduce error from signal estimation. Unfortunately, the aforementioned "omniscient" requirements for THP BS are prohibitive for current practical implementations; this is especially true and burdensome with regard to knowing in advance the data to be transmitted (in effect requiring a voice call, video streaming, etc. to occur, and the transmission of the data to be delayed).

Lastly, Code Division Multiple Access (CDMA)-based solutions achieve near perfect elimination of ICI using code orthogonality. Neighboring cells use codes that are orthogonal to the codes of the BS considered for communication with a UE. The transmissions are "spread" by an orthogonal code at the BS. At the receiver, the transmissions are "de-spread" to extract the original transmission. ICI originating at a neighbor BS does not significantly correlate (due to the code orthogonality properties), and therefore contributes near-zero noise. CDMA technology may be described as "Rate-1 Frequency-Reuse", which refers to the fact that there is effectively no ICI between neighboring cells.

While CDMA based solutions are ideal for noise rejection purposes, CDMA systems suffer from other limitations (remaining interference between theoretically orthogonal codes, propagation delay, transmit power adjustment, etc.). Future systems considered in the International Mobile Telecommunications Advanced (IMT-Advanced) framework (i.e., 3GPP LTE Advanced, WiMAX evolution based on IEEE 802.16m, IEEE 802.11 "VHT" (very high throughput), etc.) are expected to be based upon OFDM and OFDMA, due in part to the limitations of CDMA-based systems. Therefore, it is highly desirable that OFDMA based networks approach near "Rate-1 Frequency-Reuse" efficiency.

Accordingly, there is a salient need for improved apparatus and methods which improve OFDMA frequency-reuse by, inter alia, minimizing inter-cell interference. Such apparatus and methods would ideally be implemented within existing radio access network infrastructure (i.e., without requiring significant upgrades or modifications to the network infrastructure), and operate within extant practical limitations such as computational ability and information limitations that would otherwise inhibit "perfect" behavior.

Ideally, such improved methods and apparatus would also be transparent to the UE, so as to allow seamless integration with existing (legacy) UE deployments. They would also be consistent with, and even leverage existing wireless network policies and functional capabilities, and would minimally impact network latency and processing overhead.

SUMMARY OF THE INVENTION

The present invention satisfies the aforementioned needs by providing improved apparatus and methods for reducing inter-cell interference in a wireless network.

In one aspect of the invention, a method of operating a wireless transmitter is disclosed. In one embodiment, the method comprises applying partial interference reduction in the transmitter, the partial interference reduction being based at least in part on a priori information received from at least one other transmitter, the information relating to signals to be transmitted at a future time.

In one variant, the at least one other transmitter comprises a plurality of cellular base stations geographically proximate to the transmitter.

In another variant, the signals comprise non-data signals selected from the group consisting of: (i) pilot tones; (ii) learning sequences; and (iii) frame or packet preambles.

In another variant, the wireless transmitter comprises a base station within a wireless network employing an orthogonal frequency division multiple access (OFDMA) access scheme. The wireless network may comprise a UMTS-based long term evolution (LTE) network, and the information received at the wireless transmitter may comprise information received over an X2 communications link.

In still another variant, the signals comprise pilot tones, and the method further comprises: determining a context of a mobile receiver to which the signals will be transmitted; and based at least in part on the determining, selecting a pilot tone density.

The determining a context may comprise determining if the mobile receiver has a mobility greater than or less than a threshold value.

In yet another variant, the wireless transmitter and the at least one other transmitter comprise neighboring macrocell base stations within a cellular network.

In still yet another variant, the a priori information received from at least one other transmitter comprises scheduling information relating to at least one future transmission schedule for pilot tones.

In a second aspect of the invention, a method of mitigating interference is disclosed. In one embodiment, a method of mitigating inter-cell interference within a multi-cell wireless network comprises: selectively distributing individual ones of a plurality of pilot tones over individual ones of a plurality of time-frequency resources of the network; and aligning at least one data frame sent by one cell of the network with respect to a data frame sent by another cell of the network; wherein the acts of distributing and aligning cooperate to substantially mitigate the interference occurring at a receiver of the network.

In one variant, the one cell and the other cell of the network comprise neighboring fixed base stations within a UMTS-based cellular network.

In another variant, the aligning comprises at least partly overlapping at least one of a learning sequence and a frame preamble of the data frame sent by the one cell with a data portion of the data frame sent by the other cell. The at least partly overlapping may comprise maximizing an overlap of both the learning sequence and the preamble with the data portion and the at least partly overlapping comprises aligning at least one frame portion boundaries of the data frame sent by the one cell with frame portion boundary of the data frame sent by the another cell.

In still another variant, the method further comprises transferring information relating to the pilot tones between at least to cells of the multi-cell network, the transferred information facilitating the act of selectively distributing the pilot tones. The method may further comprise applying a precoding process to signals sent from at least one of the cells, the precoding based at least in part on the transferred information relating to the pilot tones. The precoding may comprise Tomlinson-Harashima precoding (THP).

In a third aspect of the invention, a base station apparatus is disclosed. In one embodiment, the base station apparatus comprises: a digital processor; a wireless interface in data communication with the processor; a network interface in data communication with the processor; and a storage device in data communication with the processor, the storage device comprising instructions that, when executed by the digital processor: receive information of a first future non-data signal from the network interface; and modify operation of the wireless interface; wherein the modification of the operation reduces interference caused by the first non-data signal at a receiving device.

In one variant, the modification of the operation comprises a precoding of the first future non-data signal according to a Tomlinson-Harashima Precoding (THP) technique.

In another variant, the modification of the operation comprises a change to the transmit scheduling of the wireless interface and the transmit scheduling comprises increments of time according to a regular time interval. The time interval may comprise a transmission time interval for an OFDM symbol.

In still another variant, the transmit scheduling comprises transmission times in one or more irregular increments. The one or more irregular increments may shift the transmission to a time offset from one or more other base station data signals.

In yet another variant, the storage device further comprises instructions that when executed by the digital processor transmit information relating to a second non-data signal via the network interface, the information being adapted to modify the operation of one or more neighboring base stations to improve interference reduction caused by the second non-data signal at the receiving device.

In a third aspect of the invention, a method of operating a transmitter is disclosed. In one embodiment, a method of operating a wireless transmitter, the transmitter being part of a network having a plurality of transmitters, the method comprises: precoding only non-data portions of signals sent by at least the transmitter, the precoding being based at least in part on data received from other ones of the transmitters regarding their future transmissions of corresponding non-data portions of their signals.

In one variant, the precoding comprises Tomlinson-Harashima precoding (THP).

In another variant, the precoding comprises signal processing adapted to selectively alter the amplitude of at least portions of a waveform sent by the transmitter corresponding to the non-data portions.

In a fourth aspect of the invention a receiver apparatus is disclosed. In one embodiment, the receiver apparatus, comprises: a digital processor; a wireless interface in data communication with the digital processor; and a storage device in data communication with the processor, the storage device comprising at least one computer program which, when run on the processor: receives data relating to an at least partly corrupted symbol received over the wireless interface; suppresses at least one first signal from an interfering source, the at least one first signal having been processed for partial interference reduction; suppresses at least one second signal from an interfering source, the at least one second signal not having been processed for partial interference reduction; and decodes the received symbol to extract useful data.

In one variant, the processing for partial interference reduction comprises processing only with respect to non-data portions of the at least one first signal. The processing may comprise Tomlinson-Harashima precoding.

In another variant, the suppressing comprises: estimating at least one interfering signal on carriers for which the partial interference reduction processing was performed; decoding the estimated signal; re-encoding the estimate signal; and subtracting the re-encoded signal from the received symbol.

In a fifth aspect of the invention, a method of scheduling signals is disclosed. In one embodiment, a method of scheduling signals within a cellular network by utilizing a mode of communication between a plurality of base stations to reduce received inter-cell interference at one or more receiving devices, the method comprises: providing a schedule for non-data signaling for each one of the plurality of base stations; and modifying a transmission from a first of the plurality of base stations, the modifying being based at least in part on the schedule; wherein the modifying reduces the effects of interference caused by the non-data signaling on the transmission.

In one variant, the schedule for the non-data signaling is arbitrated during base station operation.

In another variant the schedule is used, at least in part, to determine appropriate transmissions of at least one of a preamble; a learning sequence; or a pilot tone. The schedule may be repeated for multiple transmissions.

In still another variant, the schedule is repeated multiple times to determine the appropriate transmissions of at least one or more of: a preamble, a learning sequence, or a pilot tone.

In yet another variant, the schedule for the non-data signaling identifies transmission times in increments of a regular time interval. The regular time interval may comprise a transmission time interval for an Orthogonal Frequency-Division Multiplexing (OFDM) system.

In still yet another variant, the schedule for the non-data signaling identifies transmission times in one or more irregular increments. The one or more irregular increments may align reception of the non-data signaling with the first base station transmission coincident at the one or more receiving devices.

In another aspect, a computer-readable apparatus comprising a storage medium and adapted for use within a wireless transmitter or receiver is disclosed.

In yet another aspect of the invention, business methods and models employing one or more of the foregoing aspects are described.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 8A is a graphical illustration of one embodiment of the method time-shifting signals in accordance with the principles of the present invention.

FIG. 8B is a graphical illustration of a second embodiment of the method time-shifting signals in accordance with the principles of the present invention.

DETAILED DESCRIPTION OF THE INVENTION

Figure 1A:
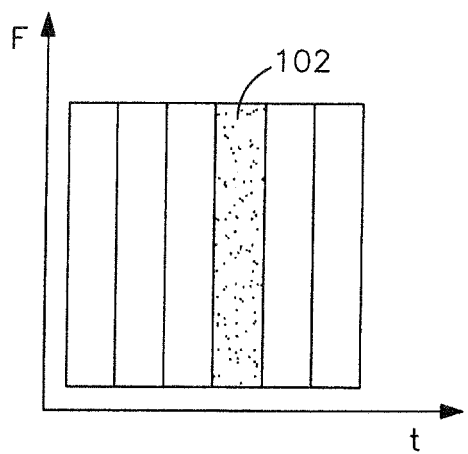
FIG. 1A is time and frequency plot of a typical prior art Time Division Multiple Access (TDMA) implementation.
Figure 1B:
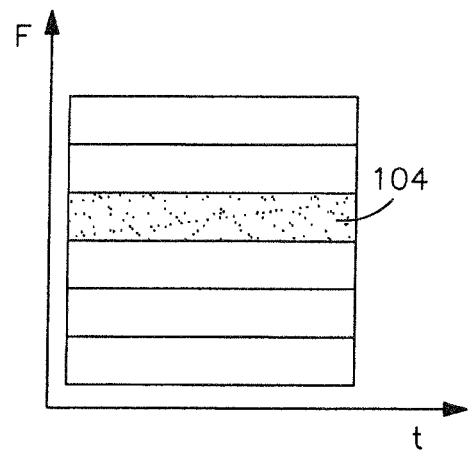
FIG. 1B is time and frequency plot of a typical prior art Frequency Division Multiple Access (FDMA) implementation.
Figure 1C:
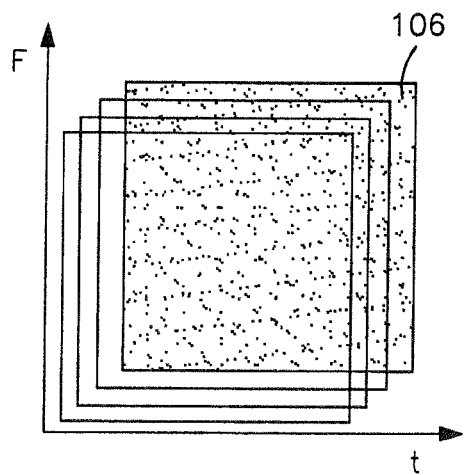
FIG. 1C is time and frequency plot of a typical prior art Code Division Multiple Access (CDMA) implementation.
Figure 1D:
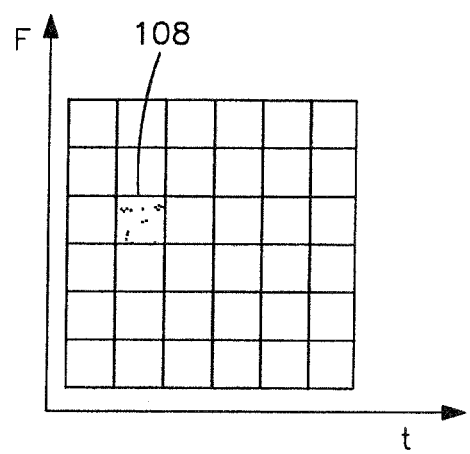
FIG. 1D is time and frequency plot of a typical prior art Orthogonal Frequency-Division Multiple Access (OFDMA) implementation.

Reference is now made to the drawings, wherein like numerals refer to like parts throughout.

As used herein, the terms "client device", "end user device" and "UE" may include, but are not limited to cellular telephones, smartphones (such as for example an iPhone™), personal computers (PCs), such as for example a wireless-enabled iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USE (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

As used herein, the term "wireless" means any wireless signal, data, communication, or other interface including without limitation Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiFi (IEEE-Std 802.11x, including 802.11n and 802.11 "VHT"), WiMAX (802.16), MWBA/802.20, narrowband/FDMA, OFDM, PCS/DCS, analog cellular, CDPD, satellite systems, millimeter wave or microwave systems, acoustic, and infrared (i.e., IrDA), IMT-Advanced, IMT 2000, and 3GPP LTE (long term evolution)/LTE-advanced.

Overview

In one fundamental aspect, the present invention provides methods and apparatus that enable a multi-cell wireless network (e.g., cellular telephone network) to schedule known data signals (such as pilot tones) or non-data signals (such as preambles or learning sequences) in order to minimize inter-cell interference (ICI). In one embodiment, the wireless network utilizes an OFDMA spectral access technique, and the base stations collaborate on dynamic modification of their non-data schedules, so as to mitigate ICI at the receiver (e.g., mobile device or UE). Unlike user data signals, the pilot tones or non-data signals can be rapidly communicated between the various base stations or known a priori, thereby avoiding any significant latency in implementing the aforementioned dynamic schedule modification. Furthermore, due to the regular nature of such scheduling, communication between base stations can be advantageously limited to relatively infrequent modification of pilot tone or non-data schedules. Hence, by applying the techniques of the present invention to only known or predictable portions of the transmitted signal (hence the term "partial interference reduction"), this aspect of the invention obtains a high level of ICI reduction, while not sacrificing latency or requiring excessive processing overhead or resources within the base stations or UEs.

In one variant, pilot tones are chosen among neighboring base-stations on distinct time/frequency resources. The "density" of pilot tones (i.e., rotating from one symbol and/or frame to another) is dynamically adapted depending on the context of the target UE; e.g., a UE that is in a higher-mobility context will typically use a denser pilot pattern (in order to be able to track channel impulse response changes more quickly) as compared to the UE in a lower-mobility context. Some or all base stations exchange information with neighboring base stations regarding (i) when frames containing the pilot tones will be sent, and (ii) which pilot pattern will be used in the future. Additionally, some or all of the base stations may communicate the CIRs associated with all "downstream" (BS-to-UE) radio channels.

In another aspect of the invention, the transmitted signals may be "reshaped" (by exploiting a priori knowledge on pilot symbols or other signals) such that the interference occurring at the target UE is reduced. In one variant, a BS sending a signal to a given target UE knows the transmit time and position of pilot signals that will be sent by other base stations. A portion of these pilot signals will interfere with the useful data to be decoded by the target UE. By exploiting knowledge of the pilot signals to be sent by the other base stations, the transmitting BS can apply precoding techniques (such as Tomlinson-Harashima precoding), such that only pilot tones are considered for interference cancellation, as opposed to the more complex and laborious approach of the prior art, which considers user data. Advantageously, the interference caused by the interfering BS pilots is substantially eliminated for the target UE. The target UE may also be informed about the OFDM carriers where interference suppression is applied by the transmitting BS such that the UE can take the reduced SINR (Signal-to-Noise-plus-Interference-Ratio) for the signals into account in the decoding process.

In yet another aspect of the invention, a priori knowledge of other (non-data) signals such as learning sequences and/or frame preambles can be exploited for the reduction of ICI. Such learning sequences and preambles occupy larger parts of the frequency spectrum, as compared to the aforementioned pilot tones, which are distributed over the available time/frequency resources on a per-tone basis. As with pilot tones, however, the learning sequences and preambles can be readily known and circulated between relevant bases stations with low latency and limited inter-BS-signaling (e.g., over the X2 interface in the exemplary case of LTE). Since more of the frequency spectrum is known a priori for learning sequences and preambles (as compared to pilot tones), interference cancellation can be more efficient. A time shift of distinct frames is therefore invoked such that the preamble and learning sequence fields of the interfering BS frame lie in the same time interval as the data portion of the frame carrying useful data symbols from the transmitting BS.

In yet another variant, a "split" (i.e., BS- and receiver-based) approach is used, wherein knowledge of the interference-reduced signals transmitted from the BS is utilized in order to extract useful data from corrupted received signals (e.g., OFDM signals).

Improved UE and transmitter (e.g., base station) apparatus implementing one or more of the foregoing aspects are also disclosed.

DETAILED DESCRIPTION OF EXEMPLARY EMBODIMENTS

Exemplary embodiments of the present invention are now described in detail. While these embodiments are primarily discussed in the context of an Orthogonal Frequency Division Multiple Access (OFDMA) cellular network, it will be recognized by those of ordinary skill that the present invention is not so limited. In fact, the various aspects of the invention are useful in any wireless network that can benefit from scheduled management of non-data signals and signal precoding as is disclosed herein.

It will also be appreciated that while described primarily in the context of a single wireless network (e.g., WiMAX, LTE, WLAN, etc.), the methods and apparatus of the invention can be applied to two or more networks which may even be heterogeneous in nature (e.g., different air interfaces, etc.) for enhanced coexistence and interference suppression. For example, such coexistence and suppression may be achieved between distinct air interfaces (standards) whenever they are operating in the same or overlapping frequency band.

Figure 2:
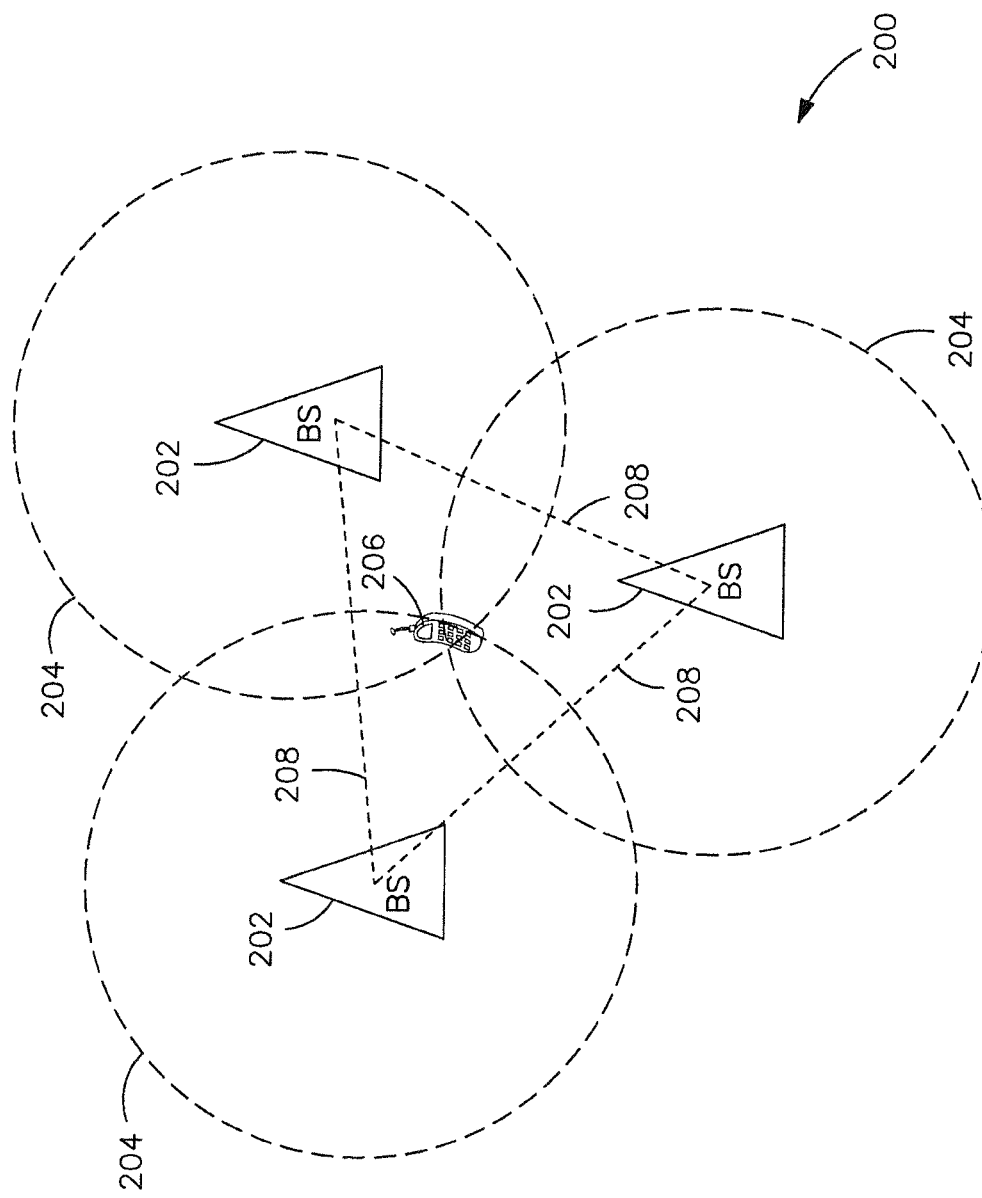
FIG. 2 is a graphical representation of a typical prior art cellular telephone system.
Figure 2A:
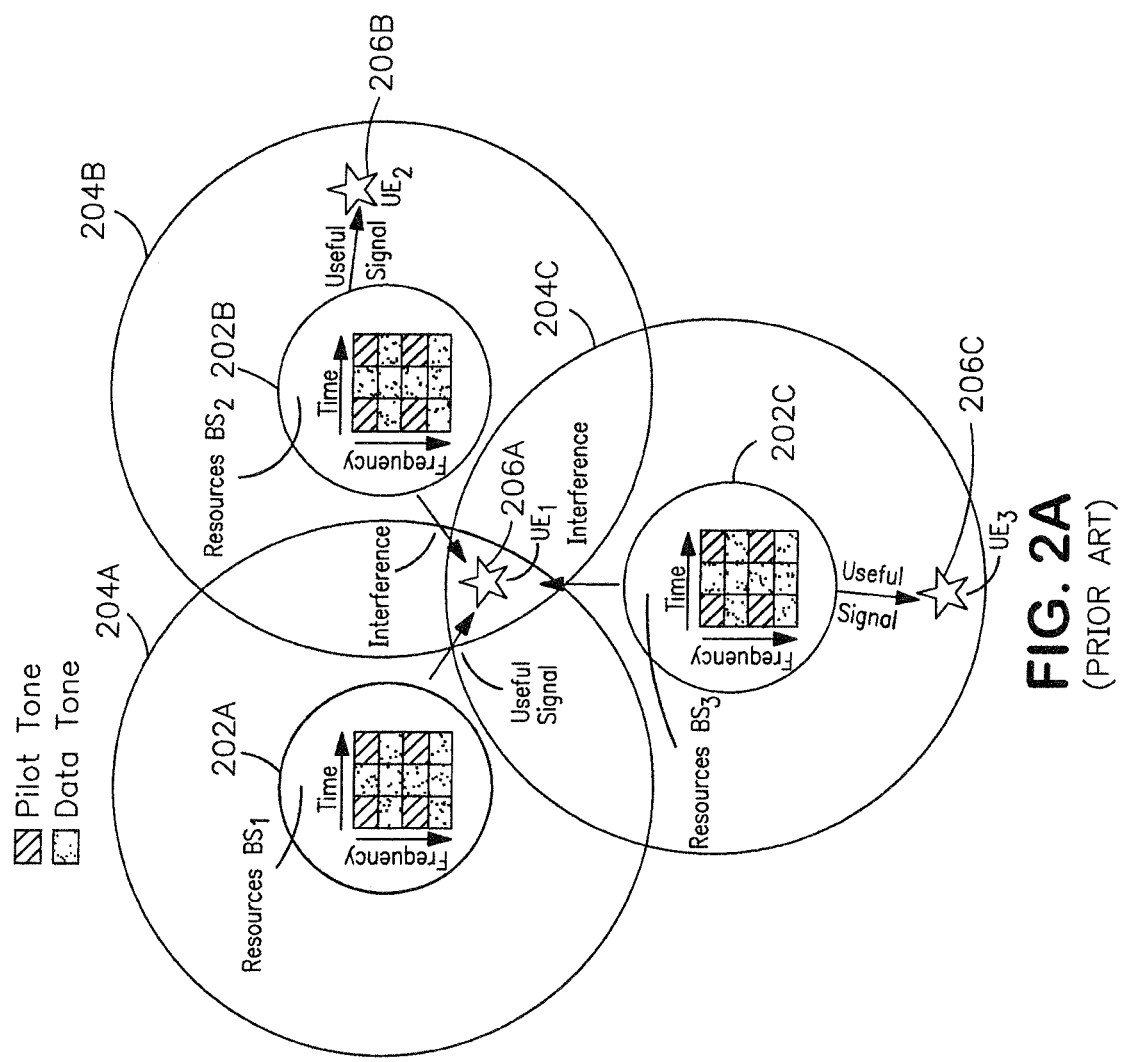
FIG. 2A is a graphical illustration of a typical prior art OFDMA cellular system implementing 3GPP LTE technology.
Figure 2B:
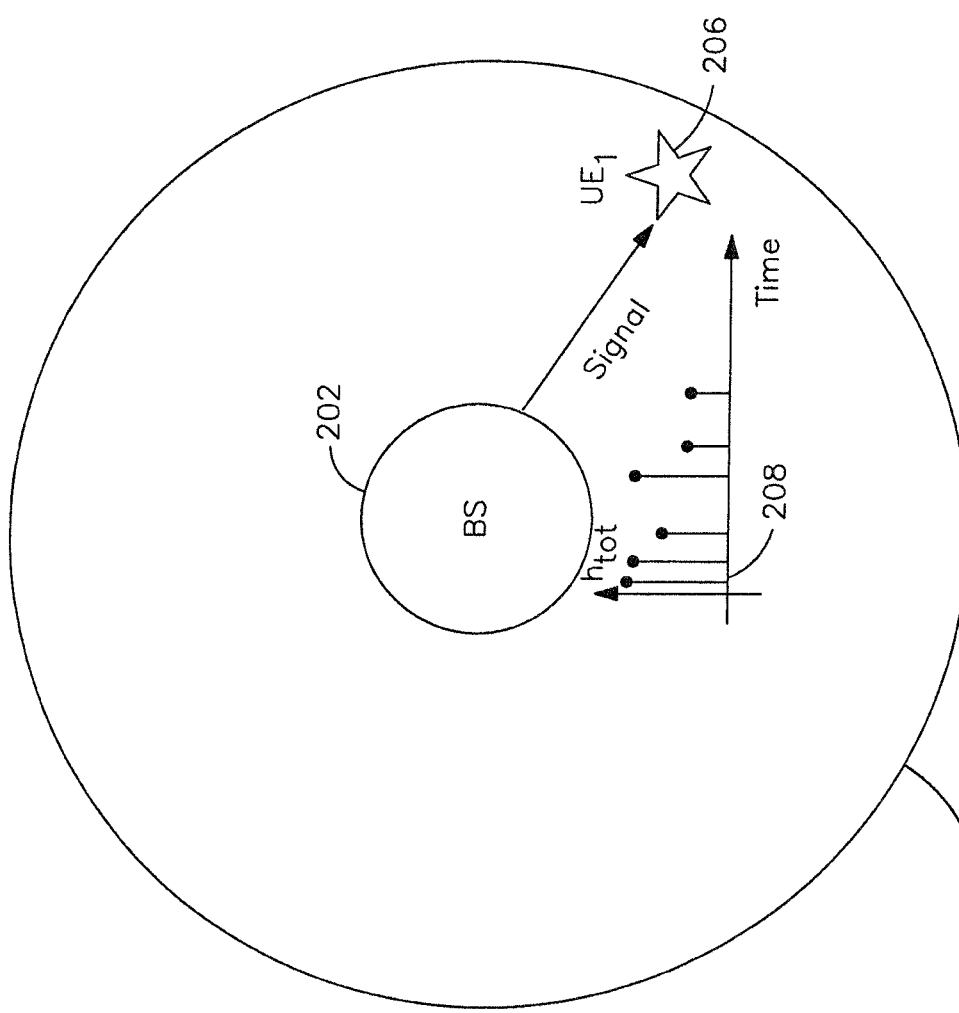
FIG. 2B is a graphical illustration of the process of forming an "imaginary" base station comprising the superposition of three (3) actual base stations.
Figure 3:
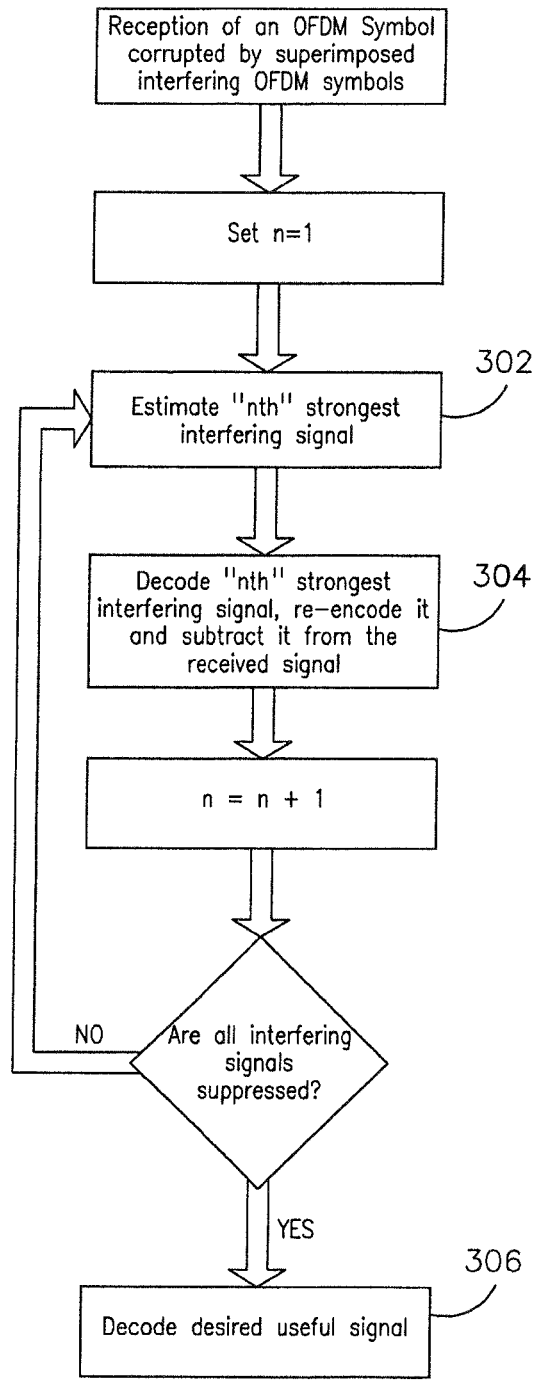
FIG. 3 is a logical flow diagram illustrating a typical prior art method of implementing interference reduction at the UE.
Figure 4:
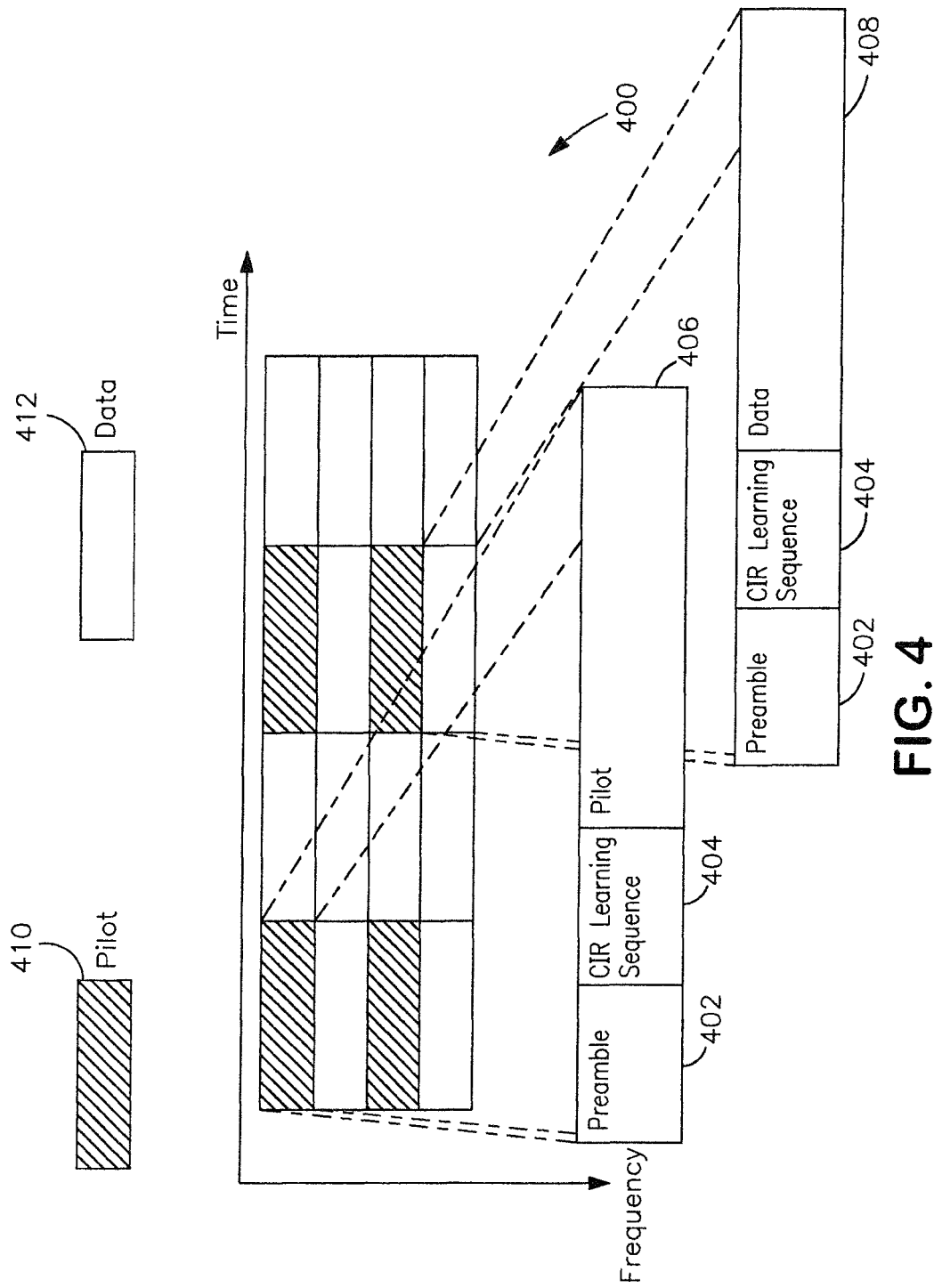
FIG. 4 is a graphical representation illustrating the time-frequency resources allocated in an exemplary OFDMA cellular system such as that shown in FIG. 2A.

Referring back to the architecture of FIG. 2A, the BS 202A transmitting useful data to the target UE 206A, has interfering signals from neighboring BS 202B and 202C. As shown, the transmissions of 202A, 202B, and 202C are diagrammed with a miniature representation of an OFDMA time-frequency resource graph. FIG. 4 shows the time-frequency resources in greater detail. Each time-frequency resource is divided into three components: (i) a preamble 402, (ii) a CIR learning sequence (or training sequence) 404, and (iii) a signal component, although it will be recognized that other structures and components may be used with the invention described subsequently herein.

The preamble 402 enables an initial fast synchronization between the BS 202 and the UE 206. The preamble provides rough timing alignment, and can be used to narrow the UEs initial search for a candidate BS.

The CIR 404 learning sequence is a prior known sequence, used by the receiver, for estimating the impulse response of the channel. The OFDM receiver compares the received data, i.e., the output of the channel, with the prior known training sequence. Based on the resultant difference between received and expected results, the receiver may apply advanced signal processing algorithms to estimate the channel effects.

The signal component (iii) is further divided into two types: a pilot tone or signal 406, and data 408. Pilot time-frequency resources 410 comprise a pilot tone, and provide a timing reference for the OFDM system. Data time frequency resources 412 are used for data transmission. Each UE demodulates the pilot signal to perfectly synchronize its timing reference with its serving base station. The pilot signal 406 is not a data signaling construct, despite being in a "data field". The data payload 408 may be any form of data, which has been packetized and formatted for transport.

These transmission components (e.g. preamble, learning sequence, and pilot tones) of the frame are simple, and advantageously may be quickly reconstructed. Scheduling information is also simple to transmit. Thus, these components can be communicated to other neighboring base stations without undue impact on the latency or overhead processing of the system. Once coordinated, each BS transmitter can exploit knowledge of non-data signals from neighboring base stations and adjust their corresponding transmissions to minimize ICI.

In the present context, various definitions of a "neighboring cell" can be applied, depending on the particular network implementation (including e.g., the level of communications between cells, level of extant processing overhead, density of base stations, etc.). In one embodiment, a cell served by a BS #1 is considered to be a neighboring cell of cell (BS) #2 if: i) the transmission bands overlap at least partly between the BSs of cells #1 and #2; and ii) the maximum transmitted power spectral density from BS #1 perceived in cell #2 (i.e., typically the transmitted power spectral density of the BS in cell #1 combined with the propagation path loss which the signal undergoes prior to arriving in cell #2) is above a defined threshold. This threshold depends on the transmission parameters of the BS in cell #2, including for example the channel coding scheme, the signal constellation type (BPSK, QPSK, QAM16, QAM64, QAM256, etc.), the target Packet Error Rate (PER), etc. This threshold may be statically employed (i.e., does not change with time or operating conditions), or alternatively may be dynamically varied as a function of one or more of the foregoing parameters. For instance, if the target PER/BER increases, then more cells might be considered "neighbors" so as to account for or mitigate their interference effects. In one variant, a specific "threshold value" in the range from approx. 0 dB (assuming strong turbo coding or LDPC (low density parity check) coding, and very robust constellations such as BPSK) to approx. 45 dB (assuming channel coding and sensitive constellation types such as QAM256) is utilized, although it will be recognized that other values and ranges may be applied. Hence, with the foregoing definition, any cell that potentially impacts the decoding of the useful signal of a given cell is considered to be a "neighboring" of that latter cell.

Other definitions and schemes for determining neighboring cells will also be recognized by those of ordinary skill given the present disclosure, the foregoing being merely exemplary.

Methods—

Figure 5:
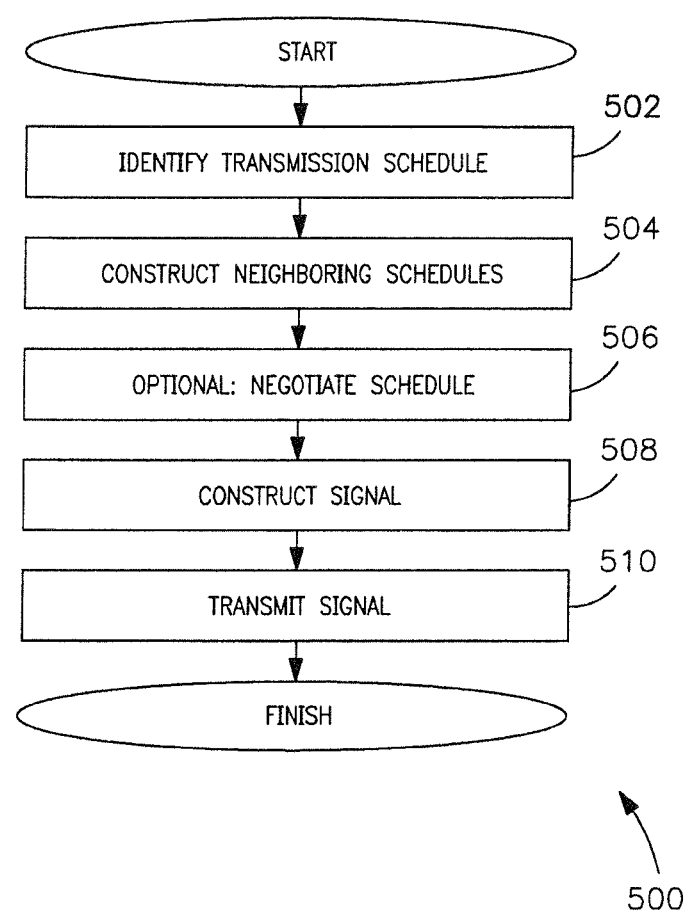
FIG. 5 is a logical flow diagram illustrating one embodiment of the generalized interference reduction scheme for non-data transmission by a BS in accordance with the invention.

Referring now to FIG. 5, one embodiment of a generalized interference reduction scheme for non-data transmission procedure 500 for implementation by a BS according to the invention is illustrated. The primary operative elements as described with respect to the methodology of FIG. 5 are one or more base stations (BS) concurrently serving one or more UEs.

At step 502 of the method 500, the BS identifies or generates a transmission schedule. In one embodiment, the BS identifies a regular sequence of transmission, such as a regular transmission of non-data and data transmissions. Exemplary non-data signals might comprise (without limitation) preambles, learning sequences, pilot tones, and any combination thereof. Highly periodic transmission of simple non-data signals (such as the aforementioned preambles, learning sequences, and pilot tones) should ideally be identified and used first, as there is minimal signaling overhead required for information distribution (e.g. type of signal, schedule, modification data, etc.) associated with these signals. Note also that cyclically transmitted "useful data", e.g. broadcasting of publicity or similar may be used as the basis for interference reduction as well. These sequences may be made known to multiple BS without adding a large overhead, if these identical sequences are transmitted multiple times.

To this end, the present invention contemplates in one variant the use of a hierarchy selection algorithm which can, inter alia, select the best candidates for use first, the next best candidates for use second, and so forth. For instance, the best candidate may in one case be considered the most periodic (regular), the second best candidate the next most periodic, etc. Alternatively, a hierarchy based on known characteristics or type (e.g., LS or preamble first, since these give ostensibly the best frequency spectrum and hence interference reduction potential, followed by pilot tones which are more restricted) can be implemented. This decision analysis can be based on e.g., analysis of actual prior transmissions, prior knowledge of the transmission schedule (e.g., such as that stored in memory, distributed over the inter-cell communication network), etc. In this fashion, the implementation can dynamically optimize its selection of the non-data signals it uses as the basis for interference reduction.

Moreover, this concept can even be extended to "multi-standard" scenarios (i.e., cases where multiple air interfaces are operating). For example, if the preambles (or similar portions) of one air interface standard are combined with interference suppression for data tones of another air interface standard (sharing the same frequency band in the context of flexible spectrum usage), a "hierarchy of standards" may be utilized, with the standard offering the best interfere reduction potential (e.g. the most preambles or similar) being selected first, and so on.

It will be appreciated that in an alternate embodiment, the non-data signals may none-the-less be handled when irregularly or aperiodically occurring, if they are simply constructed. For irregular non-data signals, a threshold value (such as a minimum duration of transmission, a minimum number of affected users, and/or a minimum transmit power, maximum frequency of occurrence, etc.) or other such criteria may be required to be implemented in order to prevent unnecessary scheduling overhead among the various base stations.

Moreover, if the irregularity or aperiodicity is deterministic, such information may be useful in utilizing the aperiodic non-data signals more effectively. Note also that periodic non-data signals only require the indication of a starting point, and the associated periodicity, as information to be exchanged between the BS (e.g., "starts at time t and repeats every q seconds" or the like) For irregular or aperiodic sequences, the transmission schedule for (a limited number of) forthcoming transmissions needs to be exchanged more explicitly and frequently.

It is further noted that a BS may detect by itself the presence of non-data signals originating from neighboring BS, and decide itself whether to exploit this for interference suppression purposes or not. For example, if there is no data exchange between base stations, a BS #1 may detect that a neighboring BS #2 is starting a transmission of a WLAN frame or other such data structure. As soon as the BS detects the first elements of the preamble, it knows which further learning symbols will follow and which pilot tones will be used. It can thus exploit this knowledge by blind detection of the neighboring transmission only. However, the channel impulses of the interfering BS and the target UE still must be known. This latter information can be obtained in any number of ways that will be recognized by those of ordinary skill given the present disclosure, including e.g., by another BS, or even the UE itself.

At step 504, the BS constructs a schedule of the neighboring BS transmissions. For regular, periodic transmissions, the BS may have a locally stored schedule (or may be able to determine it based on a known relationship and e.g., a timing or other alignment reference). For irregular transmissions, the BS must update its schedule, directly or indirectly. However, it is recognized that in some variants, the ES may not account for or ignore irregular transmissions due to the additional processing complexity required for runtime updates. In other variants, however, the BS may account for regularly scheduled data signals, as well as non-data signals. Ideally, the BS schedule construction computation does not significantly affect the latency of the system, although this variable (degree of latency) can be traded-off for other performance gains if desired, even on a dynamic basis. For instance, where latency is less critical, more computation or overhead may be sustained by the BS if it will lead to other gains in system performance or desired operational attributes.

Furthermore, the level of possible/meaningful information exchange between base stations may be impacted by the BS connection technology. For instance, if there is a fiber connection between BS, the information exchange will occur at a high rate, and induce little if any latency. In case of coaxial cables or even wireless links, for example, the maximum rate or volume of information to be exchanged may be lower.

In one exemplary embodiment, the BS "community" (i.e., two or more designated BS that cooperate) can directly communicate among one another to transmit future schedules. Such communications can occur over literally any type of communications or network interface, whether wireline or wireless, and ideally is supported via extant communication channels between the base stations that support operation of the cellular network. For deterministic non-data signals of high repetition, this communication is implemented according to a protocol, such as one comprising messaging that minimally includes a request and response, or alternatively a periodic broadcast (multi-cast). For non-deterministic non-data signals, messaging may comprise a notification and an acknowledgment. For example, in one exemplary implementation, the BS 202 communicates their scheduling information within a 3GPP LTE system via the X2 interface 208 and associated protocol of the type previously referenced herein.

As an alternative to direct scheduling, the BS may also indirectly determine the schedule of neighboring BS. Enabled BS deployments with legacy devices may require the BS to determine the neighboring BS non-data transmissions in the same method that a UE typically would (e.g. reception and evaluation of a neighboring BS radio broadcast).

Step 506 of the method 500 allows the BS to optionally negotiate its schedule to other base stations. Steps 504 and steps 506 may also be combined in some implementations, if expedient or otherwise desirable to do so. The BS may communicate its schedule to other enabled BS (or a determination/calculation entity such as a server or network proxy), and/or arbitrate conflicting schedules. In some circumstances, (such as with legacy devices) the BS may opt to forgo schedule negotiation. Alternatively, in other embodiments, the BS may only communicate its schedule only when affirmatively queried. The matching of an appropriate negotiation/coordination mechanism and/or scheduling between base stations for various types of non-data signal transmission schedules will be readily implemented by those of ordinary skill given the present disclosure, and accordingly is not described further herein.

Once coordinated, the BS transmitter can exploit knowledge of the neighboring BSs and adjust its corresponding transmissions to minimize inter-cell interference, per step 508. This can be accomplished via any number of ways, including for example: (i) scheduling for transmission the BS's non-data tones so as to minimize overlap with the neighboring BS non-data tones; (ii) having a BS stagger its transmissions, such that its non-data tones maximally overlap the data of its neighboring BSs; or (iii) having a BS pre-code its transmissions such that its data tones are minimally affected by the non-data tones of its neighboring BSs. In this latter arrangement (iii), the BS pre-codes its data transmissions such that the ICI effects as experienced at its served UEs are minimized. In addition, it may also pre-code its non-data transmissions to minimize ICI for non-served UEs.

At step 510, the BS enables its transceiver, and signaling proceeds according to the designated schedule.

Example

Scheduling Pilot Tones

Referring again to the architecture of FIG. 2A, the steps of the generalized methodology of FIG. 5 are now described in the specific context of an exemplary staggering of pilot tones for usage within an OFDM system to improve overall spectral efficiency. A plurality of BSs ($BS_1$ 202A, $BS_2$ 202B, and $BS_3$ 202C) are each transmitting to serve a plurality of UEs ($UE_1$ 206A, $UE_2$ 206B, and $UE_3$ 206C), respectively. The proximity of the BSs causes an undesirable ICI effect localized to $UE_1$ 206A. By rescheduling neighboring cells pilot tones, the ICI due to pilot signal transmissions can be minimized.

At step 502, each BS identifies its future signaling requirements. In this case, non-data signaling requires the density of (rotating from one symbol and/or frame to another) pilot tones to be adapted depending on the context of the target UE. Each BS is assumed to know the channel impulse response (CIR) to its corresponding UE (or group of UEs). The CIR provides input to the BS to determine appropriate signaling requirements. A UE who is in a higher-mobility context or otherwise undesirable CIR will typically require a denser pilot pattern (in order to be able to track channel impulse response changes more quickly) compared to a UE who is in a lower-mobility context (e.g., fixed or slowly moving).

Each BS, having identified its signaling requirements, exchanges information with its neighboring BSs describing the schedule data, and data errata (per step 504). More specifically, each BS must successfully negotiate a schedule of frames containing the pilot tones, and corresponding pilot patterns. Thus, (some or all) neighboring BS are notified when other BS are going to send pilot tones. All BS should be in agreement (step 506) implicitly, if not explicitly (i.e., negotiation of schedule may not be possible with a legacy BS, and hence the passive or "blind" techniques of detection previously described herein may be used in such cases).

In one exemplary embodiment, the communication between BS access networks may be implemented within a 3GPP LTE (Evolved UMTS) system, utilizing the X2 208 interface between eNodeBs 202. Other communications systems and protocols may be used with equal success, however.

Figure 6:
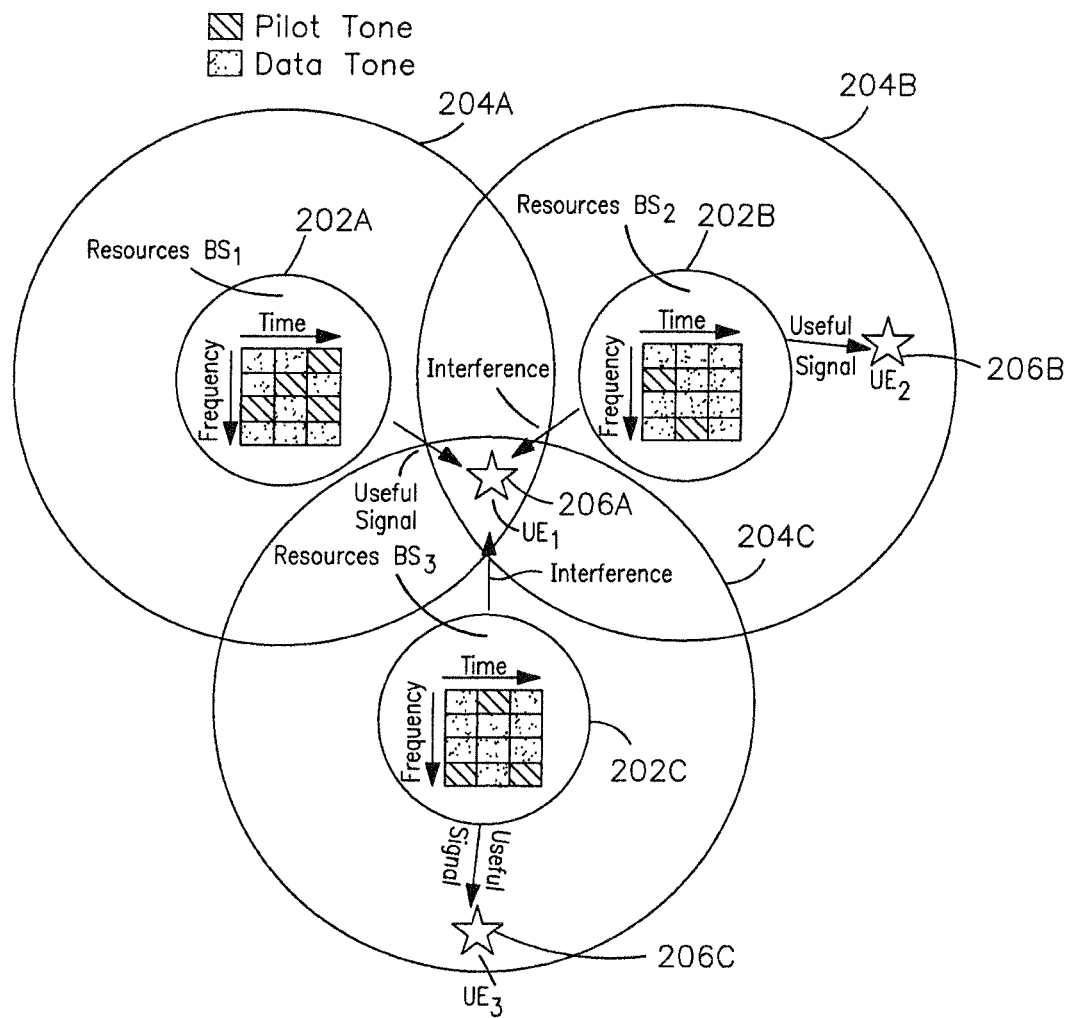
FIG. 6 is a graphical representation illustrating one embodiment of a satisfactory schedule of pilot tones among neighboring base stations in accordance with the invention.

FIG. 6 illustrates one possible satisfactory schedule of pilot tones among neighboring base stations on distinct time/frequency resources. $BS_1$ 202A serving $UE_1$ 206A has allocated four pilot tones, so as to accommodate $UE_1$'s requirement for robust pilot detection. $BS_2$ 202B and $BS_3$ 202C have reduced their carriers respectively, due to UE₂ 206B and UE₃ 206C requiring relatively low pilot power.

Steps 508 and 510 correspond to signal construction and transmission, which are not modified substantially in this example.

Compensating for Pilot Tones—

The system for pilot tone scheduling previously described herein can be further improved with precoding compensation methods. As the BS 202 sending a signal to a given target UE 206 knows the transmit time and position of pilot signals that are going to be sent by other base stations, some of these pilot signals will interfere with the useful data to be decoded by the target UE. In order to keep the latency as low as possible, and minimally reduce the load on the links connecting adjoining base stations, a BS of the exemplary embodiment has no information about the user data to be sent in the future by other BSs. However, as pilot tones are easily represented and scheduled, they may be compensated to improve spectral efficiency.

As previously discussed, the BSs 202 may collaborate on scheduling pilot tones, CIRs 208 of all radio channels from each BS to each UE 206, and timing synchronization. All these elements may be achieved using a suitable communication between the BS access networks.

In addition to scheduling of pilot tones, the BS may also collect information to facilitate reconstruction of the pilot tones. During the actual transmission, the various BS 202 may thus applying a priori knowledge of the future transmissions of their neighbors in order to additionally reduce (or ideally cancel) the interference perceived by the receiver (per step 508). The transmitted signals are reshaped accordingly, in one embodiment, by applying Tomlinson-Harashima Precoding (THP) in such a way in the transmitter that partial interference cancellation (i.e., destructive interference cancellation) is achieved at the receiving UE. It will be appreciated, however, that other "shaping" techniques and algorithms may be applied to the transmitted signals consistent with the present invention, whether based on a destructive interference cancellation approach or otherwise. While using precoding techniques can be used for interference cancellation, the complexity of sharing data symbols with other BS (due to latency issues, etc.) is prohibitive; however, the details on non-data such as pilot tones and learning symbols are simple enough to be quickly shared, and therefore can be leveraged for marked improvement in performance (i.e., reduced ICI).

Figure 7:
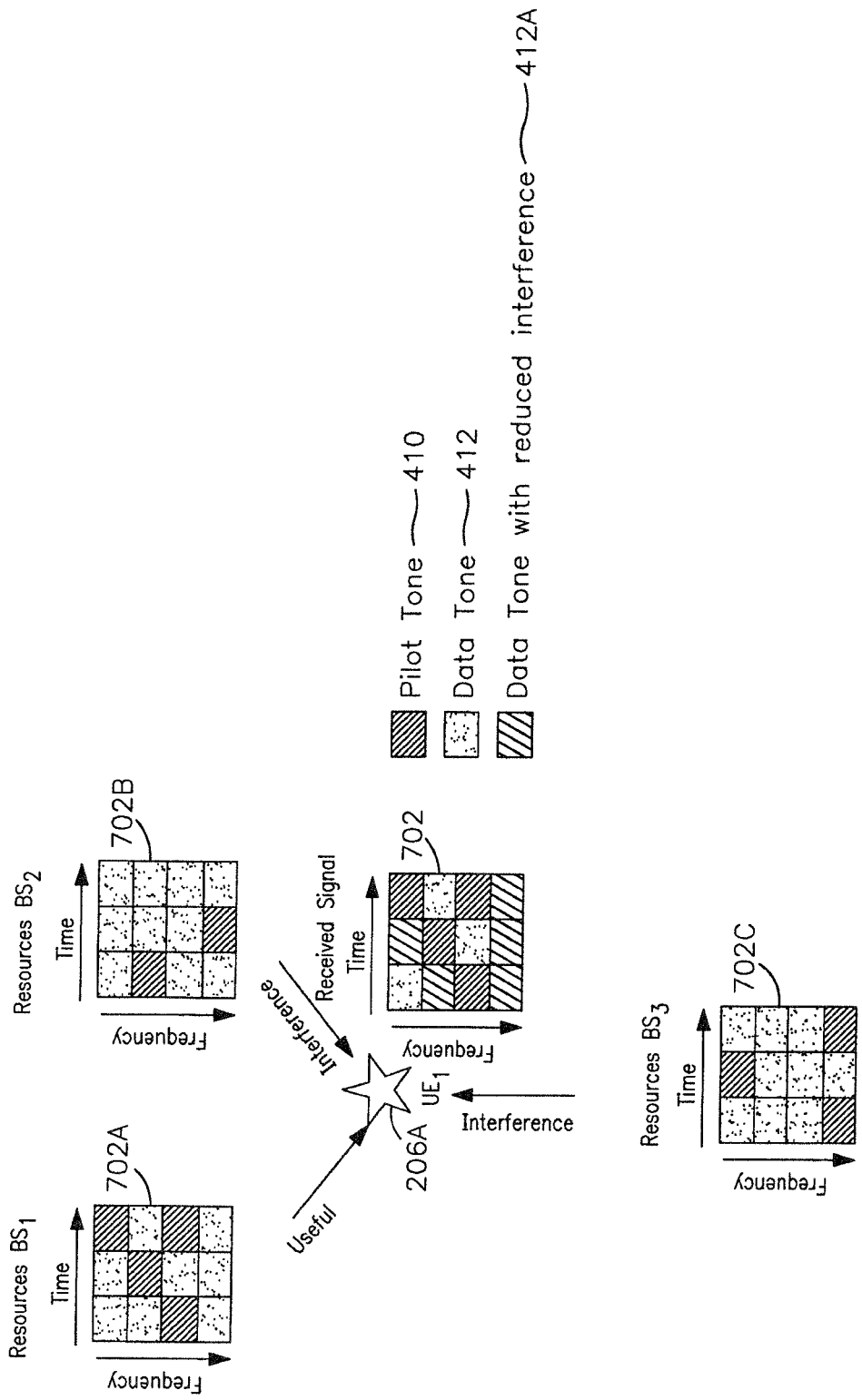
FIG. 7 is a graphical representation illustrating the received signal composition at a UE comprising the received signal from a plurality of BS along with their respective signals, in accordance with one embodiment of the invention.

FIG. 7 illustrates the received signal composition 702 at UE₁ 206A comprising, the received signal from BS₁ 202A, BS₂ 202B, and BS₃ 202C, and their respective signals 702A, 702B, and 702C. The signal composition can be further divided into time frequency resources 108, of which there are pilot tones 410, and data tones 412. Additionally shown are data tones with THP-compensated interference 412A, which are a summation of data tones 412 and pilot tones 410 which have been suppressed. Thus, the interference caused by the interfering pilots is substantially or completely eliminated for the target UE 206. The target UE is informed about the carriers where interference suppression is applied in the BS such that it can take the reduced SNR (Signal-to-Noise-plus-Interference-Ratio) for the decoding into account. By applying this technique, the interference is not eliminated over the whole frequency band, but advantageously it is considerably reduced. In particular, if a neighboring BS is targeting an increased-velocity UE and thus sending a dense pilot tone pattern, the interference reduction potential can be important. Hence, the exemplary embodiment of the present invention "trades" data-based ICI interference suppression (and its associated disabilities such as requiring a priori knowledge of the data to be transmitted at a future time) for some reduction in efficacy; the considerable ICI reduction provided by pilot-based suppression is achieved while not requiring any such a priori knowledge of the future data sequences.

Figure 7A:
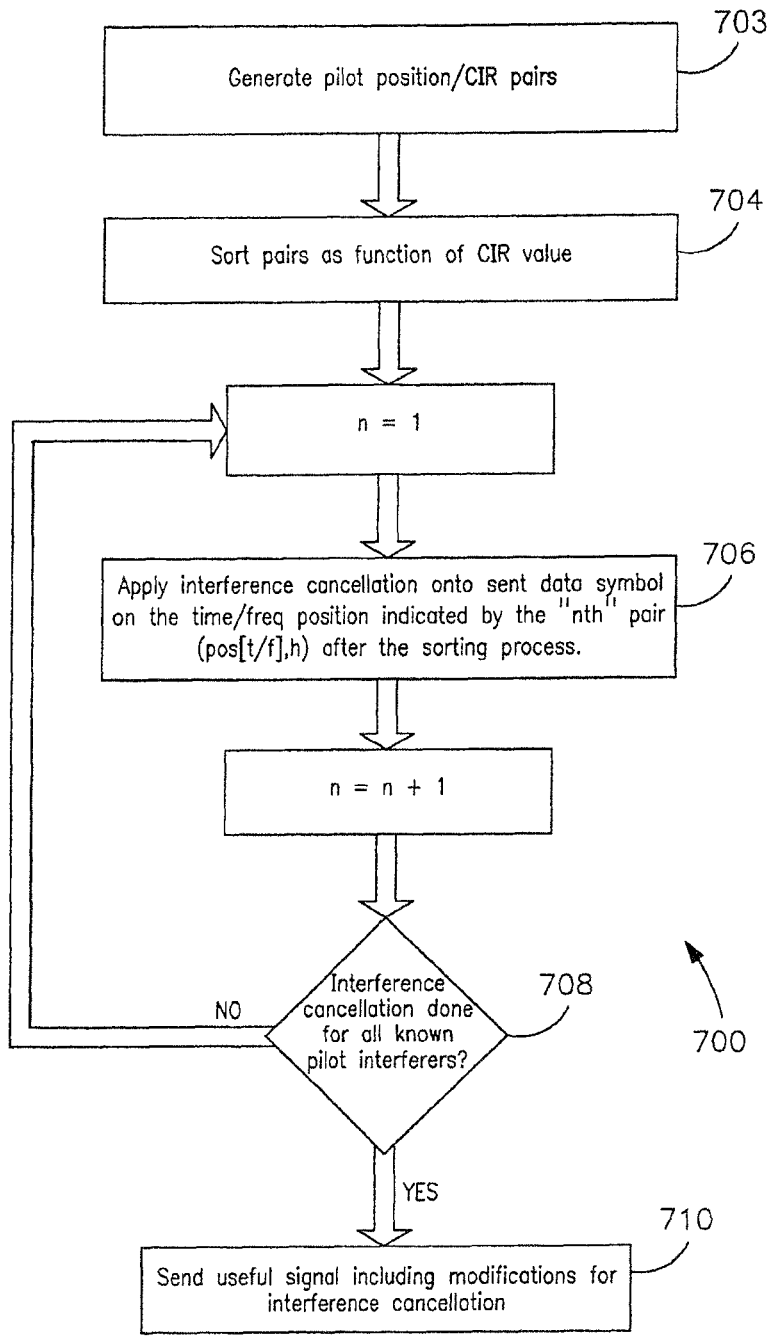
FIG. 7A is a logical flow diagram illustrating the steps for adding interference cancellation for only the pilot interfered portions of the transmitted data signal in accordance with one embodiment of the invention.

FIG. 7A illustrates the steps adapted to adding interference cancelation for only the pilot-interfered portions of the transmitted data signal according to one particular embodiment of the invention. In step 702, the pilot positions (in time-frequency domain, or "t/f") for each of the neighboring cells, and their corresponding CIRs ("h") are collected and generated as data pairs (e.g., of the format [position (t/f), h]. Any number of different formats or data structures may be used for this purpose, including matrices, tuples, etc.

Moreover, a "codebook" representation of "h" (and/or t/h), i.e. all possible "h" are represented by a comparatively small number of representative "h" values (the set of "representative h" being the codebook), and the communication between BS only indicated to the number of the "representative" h in the codebook known to all BS.

These structures are saved within the BS, such as in memory or a mass storage device.

At step 704, each interfering cell is sorted according to one or more characteristics of its relative CIR (h). In one variant, the pairs are sorted based on the magnitude of the absolute value of the CIR; i.e., lowest absolute value of h is the first pair, the next lowest CIR is the second pair, and so forth.

Unlike the prior art, which was performed across the entire transmission (data and all), steps 702 and 704 are only active during pilot transmissions to, inter alia, minimize total network latency.

In step 706 and 708, interference cancelation is performed and iterated. Note that while previous methods for interference cancellation may have been estimation dependent, step 706 uses information relating to the pilot sequences known a priori at the BS, and is therefore advantageously incorruptible. In one variant, the interference cancellation is applied on a transmitted data symbol at the time-frequency position (position(t/f)) for the first pair (n=1), and then iterated through n=2, etc. This interference cancellation comprises exploitation of the knowledge on pilot tone amplitudes for the interferers, and the CIRs of the interfering base stations at the target UE. For instance, application based on these factors might include varying the transmission phases and/or amplitudes at certain times so as to create destructive interference at the UE for the interferers.

At step 710, the signal is transmitted, having been successfully pre-coded for partial interference cancellation.

The aforementioned operation assumes limited UE device mobility. The channel impulse responses between the various BS and the target UE are assumed to change sufficiently slowly such that they can be communicated (by neighboring BSs) once and stay valid for a number of frames. While these frames are sent by neighboring BSs, the BS transmitting useful data to the target UE will exploit this knowledge (i.e., the channel impulse responses of the neighboring BS to the target UE and the pilot transmission time) in order to perform interference suppression. It is also noted that for high-mobility scenarios, it is not necessary to exchange the full estimates of the CIR cyclically, but an indication of the changes or "deltas" may be used as well (e.g., via a differential encoding scheme or similar mechanism). This approach advantageously allows for a continuous update of the CIR at a comparatively low overhead (i.e., the size of the "delta" data would be much smaller than the entire CIR data).

Additional implementation complexity is required beyond a prescribed maximum mobility threshold. Specifically, in high mobility cases, the channel impulse responses between the various BS and the target UE are assumed to change during the frame duration, causing the initial estimate of the channel impulse responses to be invalid for interference suppression during the whole frame period. In such a context, continued updates of the channel impulse response estimates to the target UE are exchanged between all BSs. These estimates are always required to be accurate enough such that they can be employed for interference suppression.

Various embodiments of the apparatus of the present invention include algorithms adapted to evaluate the sufficiency of the CIR data for ICI suppression, and selectively implement such suppression (or not). One such algorithm evaluates the position of the target UE periodically to estimate its movement, which can then be compared to a predetermined maximum threshold value to decide if suppression is useful. The UE's position can be obtained by any number of known means, including for example via a GPS/APS receiver on the UE and subsequent transmission of position information to the network, or via mechanisms intrinsic to the cellular network itself (see, e.g., co-owned and U.S. patent application Ser. No. 12/286,646 (now U.S. Pat. No. 8,103,287) filed contemporaneously herewith (on Sep. 30, 2008) and entitled "METHODS AND APPARATUS FOR RESOLVING WIRELESS SIGNAL COMPONENTS", which is incorporated herein by reference in its entirety, that describes exemplary methods and apparatus for position estimation using triangulation based on a plurality of base stations in a cellular network such as a single frequency network (SFN)). Alternatively, a results-based approach might be used, such as where changes in CIR or other parameters are evaluated on an intra-frame basis to determine if they are changing, or channel quality might be evaluated to determine if applied ICI suppression is having the desired effect.

In another variant, interference suppression may even be applied in cases where the CIR is time-variant. In such a context, the CIR used for interference suppression may not exactly coincide with the actual CIR (with the difference between the two becoming larger over time). Even if there is a difference between the CIR used for interference suppression purposes and the actual CIR, the results of the interference suppression may still improve the communication considerably (even though below the full potential of the technique). At the very least, the interference suppression may be applied starting from the moment the CIR is exchanged between the various BS (it is assumed that the actual CIR is perfectly known to all relevant BS at that stage), and the point where the correlation between the two CIRs (i.e., CIR used for interference suppression and the actual CIR) is so low that the interference suppression introduces additional interference compared to the suppressed interference for the target UE (i.e., adds no further value, but actually begins to detract).

Scheduling Preambles and Learning Sequences—

In another aspect of the present invention, the preambles 402 and learning sequences 404 occupying all or larger parts of the spectrum (in comparison to pilot tones which are distributed over time-frequency resources 108), can be likewise pre-coded. Learning sequences 404 and preambles 402 are also typically predefined sequences which can be known a priori at neighboring BS without requiring an undue amount of inter-BS-signaling. Moreover, the interference reduction achieved by shifting the preamble and CIR learning sequence is greater than that achievable with pilot tone-based interference cancellation as previously described, since a larger part of the interfering signal is known a priori to neighboring base stations.

As previously discussed with regards to FIG. 4 herein, an exemplary OFDM frame comprises a preamble sequence 402, channel learning sequences 404 (typically to be used for channel estimation), and data symbols 408. Pilot tones 406 are typically assumed to be intermingled with data tones. The preamble and CIR (Channel Impulse Response) learning sequences are typically larger compared to the pilot tones within the data part, and are also deterministic. In most cases, the preamble and CIR learning field of the entire spectral usage can be calculated or determined (as opposed to the data fields, of which, only the pilot tones are easily determined).

Consequently, interference cancellation can be efficiently distributed by time-shifting the preamble 402 and CIR learning sequence 404 fields of the interfering BS; in one variant, these are shifted to maximally coincide with the same time interval as the data part 408 of the BS transmitting the useful data symbol as shown in FIGS. 8A and 8B. Specifically, the complete overlap should be the objective if the frame structure allows for it. If not (as it is the case in FIG. 8A), the level of overlap should be maximized and the delay should be adapted correspondingly. In practice, a perfect overlap (FIG. 8B) is rarely possible and in most cases, the overlap with learning sequences is only a partial overlap. In such cases, two types of interference reduction strategies are applied: i) full interference reduction over preamble part, ii) partial interference reduction over part with useful data, typically exploiting a priori knowledge on pilot tones.

One exemplary method of time-shifting for use in the context of OFDM and OFDMA systems (such as IEEE 802.16m and LTE Advanced) comprises each BS having an entire multiple (e.g., 1×, 2×, etc.) of the duration of an OFDM symbol, including its guard interval, as a time shift 802 between the interfering signals and the useful data signal. In this implementation, it is of particular importance that the OFDM symbol border of the interfering signal and the start of the useful data signal coincide. Specifically, consider a vector "$v=(v\_0, v\_1, \ldots, v\_\{N-1\})^T$" containing the time domain samples of OFDM symbol #1, and a second vector "$w=(w\_0, w\_1, \ldots, w\_\{N-1\})^T$" containing the time domain samples of an OFDM symbol from another BS. Assuming that the "w" vector contains the interfering signal and "v" contains the useful data signal, if the two OFDM symbols coincide perfectly, the frequency domain representation of the received mixture of both is "r=FFT(v+w)=FFT(v)+FFT(w)". That is, the carriers of the interfering signal "FFT(w)" can be used independently; i.e. each carrier of "w" only interferes with a single carrier of "v". This largely reduces the complexity of the interference cancellation algorithms. If there is a small time shift (i.e., smaller than the Guard Interval or GI), this property still holds with the difference that each carrier of "FFT(w)" is multiplied with a complex phase coefficient (i.e., $d^{(j \times)}$) due to the Fourier Transform property: $FFT(x(t-t_0))=FFT(x(t))*e^{(j \cdots)}$.

However, if the delay is larger than the GI, the interfering symbol would be a mixture of two "partial" OFDM symbols; i.e. something similar to "$r=FFT(v+w)=FFT(v)+FFT([w_r(n, n+1, \ldots, N-1) \; w_2(0, 1, \ldots n-1)])$". Then, the expression "$FFT([w_1(n, n+1+1, \ldots, N-1) \; w_2(0, 1, \ldots n-1)])$" produces an "uncontrolled interference" of all carriers of "$w_1$" and "$w_2$" onto each of the carries of "v". This increases the interference reduction complexity considerably.

Hence, it is preferred that aligned overlapping OFDM symbols are utilized to reduce overhead/processing complexity; however, non-aligned symbols can be handled (yet with increased complexity).

Notwithstanding, however, it will be recognized that the order of the LS and preamble can feasibly be permuted within the illustrated data structure (frame); i.e., preamble after the LS. (i.e., the invention is not limited to the structure shown in FIGS. 8A and 8B with respect to the order of the preamble/LS).

Moreover, the LS can be placed after the data portion within the frame if desired. For example, certain standards/protocols utilize a small LS in the middle of the frame (so-called "mid-ambles").

It will also be appreciated that a complete shift of the LS and preamble (i.e., so that the preamble boundary of the useful data signal is aligned with the data portion 408 boundary of the interfering signal as shown in FIG. 8) is not always mandatory; a partial shift (i.e., so that the beginning boundary of the LS 404 of the useful signal is aligned with the initial data portion 408 boundary of the interfering signal) may be used, although this will result in less interference reduction.

In a typical implementation, one BS 202 transmits useful data to a target UE 206 (or multiple target UEs) while other (neighboring) BS are expected to use the same (frequency) resources 108. In order to improve the communication of this useful data to the target UE, all BS are negotiating the time/frequency positions of the pilot tones such that a minimum pilot overlap between the simultaneously transmitting BSs are observed at the target UE. Furthermore all BSs negotiate time shifts of the frame start timing, such that the future interference cancellation effects are maximized.

As illustrated in FIGS. 8A and 8B, the learning sequences of one BS 202 should ideally overlap maximally with data symbols transmitted on identical time/frequency resource by one or multiple other BS, FIGS. 8A and 8B show two (2) overlapping transmissions on the same frequency resource staggered in time (as opposed to FIG. 4, which shows four distinct transmissions on different frequency resources). All BS are exchanging information on the channel impulse response estimates between the BS and the target UE 206.

Target UEs receive the composition, comprised of the message from the appropriate BS, combined with interference from a neighboring BS. The various BS may send data simultaneously on identical time/frequency resources by applying interference cancellation algorithms to the signals to be transmitted. The serving BS (having pre-coded the transmission to maximally reduce interference from the neighboring BS coincident at the UE) transmission is received at the UE with minimal transmission corruption. If the channel impulse responses vary quickly (e.g., the target UE is moving quickly), the BS are required to more frequently exchange updated information on the channel estimates.

As a result, the interference perceived in the target UE (or multiple target UEs) is minimized. Furthermore, no specific treatment is required in the UE processing capabilities; all complex preprocessing is localized to the BS residing in the Radio Access Network (RAN) of the system. Certain systems, such as 3GPP LTE, preferentially shift processing power from the mobile network operator's core network to the BS in the RAN, thereby assuring that sufficient processing power already resides at the ES in order to support the present invention.

Also, the latency of the system is not increased significantly through use of the techniques described herein, since the information exchange related to pilot positions and learning sequences is independent of the useful data to be transmitted by the BS. Thus, distribution of non-signal data may be negotiated well before the actual data transmission, thereby reducing latency.

Exemplary Receiver For Partial Interference Reduction—

As previously noted, the various embodiments disclosed above are entirely BS-centric (stated differently, all of the interference cancellation processing occurs at the serving BS). The BS-centric design is advantageous in that the UE population need not be upgraded for system operation; legacy devices will work equally well with the serving base stations. However, for UEs that are aware of the partial interference reduction component of the invention, a "split" (i.e., UE- and BS-based) interference reduction scheme can be utilized to further improve UE reception and system operation.

Figure 9:
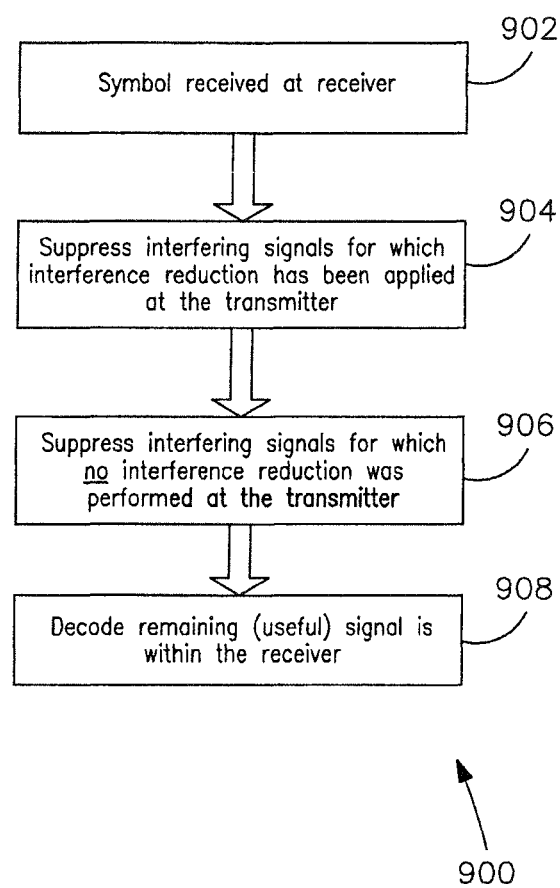
FIG. 9 is a logical flow diagram illustrating one embodiment of the generalized method of interference reduction for an enabled receiver in accordance with the principles of the present invention.

Referring to FIG. 9, one embodiment of a generalized interference reduction process 900 for an enabled receiver (e.g., UE) is shown. In this process, a symbol is first received at the receiver per step 902. The symbol has been corrupted by other interfering symbols or signals.

Per step 904, the interfering signals for which interference reduction has been applied at the transmitter are suppressed (e.g., removed or subtracted out).

Next, after all of the interference-reduced signals have been suppressed, the interfering signals for which no interference reduction was performed at the transmitter are suppressed (step 906).

Lastly, at step 908, the remaining (useful) signal is decoded within the receiver.

Figure 9A:
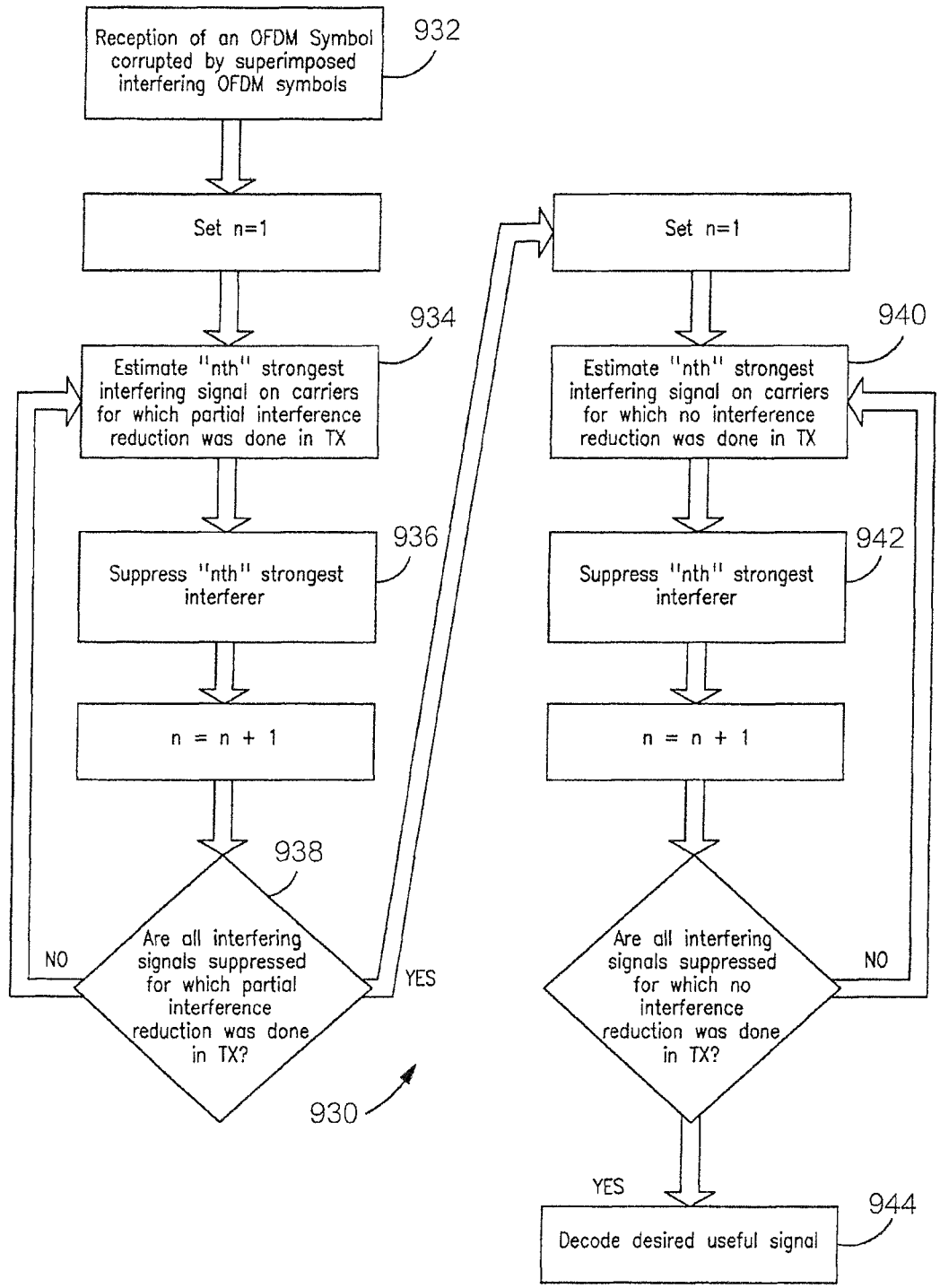
FIG. 9A is a logical flow diagram illustrating one exemplary implementation of the generalized method of FIG. 9.

Referring now to FIG. 9A, one exemplary implementation of the generalized method of FIG. 9 is now described in detail. The process 930 of FIG. 9A is comprised of two sections which handle the interference-compensated portion (e.g. 932, 934, 936), and non-compensated portion (e.g. 940, 942), respectively of an OFDM signal.

At step 932, the OFDM symbol is received at the UE. The received symbol has been corrupted by other superimposed interfering OFDM symbols.

Note that unlike the BS, the UE does not have access to a perfect model of the signals which were partially interference cancelled (reduced), and therefore this information must be transmitted a priori, or otherwise known to the UE For example, these preamble/pilot/LS, etc. signals are defined in the relevant air interface standard (e.g., IEEE-Std. 802.16e). The UE is programmed to have all such information as defined in the standard stored therein, or otherwise may receive the data (e.g., periodically) from another source.

At step 934, the strongest interfering signal present on the OFDM carriers for which partial interference reduction was performed at the transmitter is first estimated (index n set to n=1). This estimation is performed by using the transmitted or indigenously known a priori information referenced above. Step 936 of the process decodes this strongest interfering signal obtained from step 934, re-encodes it, and subtracts it from the received signal.

The fundamental concept of this step is to re-estimate received interferers, and to subtract them at the UE. This approach is somewhat akin to, e.g., the so-called BLAST MIMO scheme of the prior art, wherein various TX antennas transmit distinct signals. Each signal is assumed to be interfering to all others. In one variant of the present invention, so-called SIC (Successive Interference Cancellation) and/or PIC (Parallel Interference Cancellation) techniques of the type well known in the art can be applied in as part of steps 934 and 936 as applicable. The specific concept is that the UE tries to decode each of the interfering signals (as if it were the useful signal it wishes to decode), typically by using a decoder that maximizes the SINR for the desired interfering signal. Since interfering signals are typically weaker than the useful signals, the decoding result is often erroneous. Still, even at a relatively high BER (bit error rate), the subtraction of the re-encoded signal from the received vector can lead to a better SINR for the useful target signal.

The UE then increments the index (n=n+1), and then repeats steps 934 and 936 until all interfering signals for which partial reduction were pc/formed at the transmitter have been suppressed (subtracted out) of the composite signal.

At step 938, the UE determines if all previous partial interference reduction interferers have been suppressed (i.e., that the portions having previous partial interference reduction have been additionally processed to the best of the UE's ability and removed).

At step 940, the index n is again set to n=1, and the UE estimates the strongest interfering signal having not previously been interference-cancelled at the BS. At step 942, the interfering signal is reconstructed and subtracted from the signal composition. After all such interferers have been removed, the remaining signal is processed (decoded) by the UE at step 944.

Exemplary Receiver Apparatus—

Figure 10A:
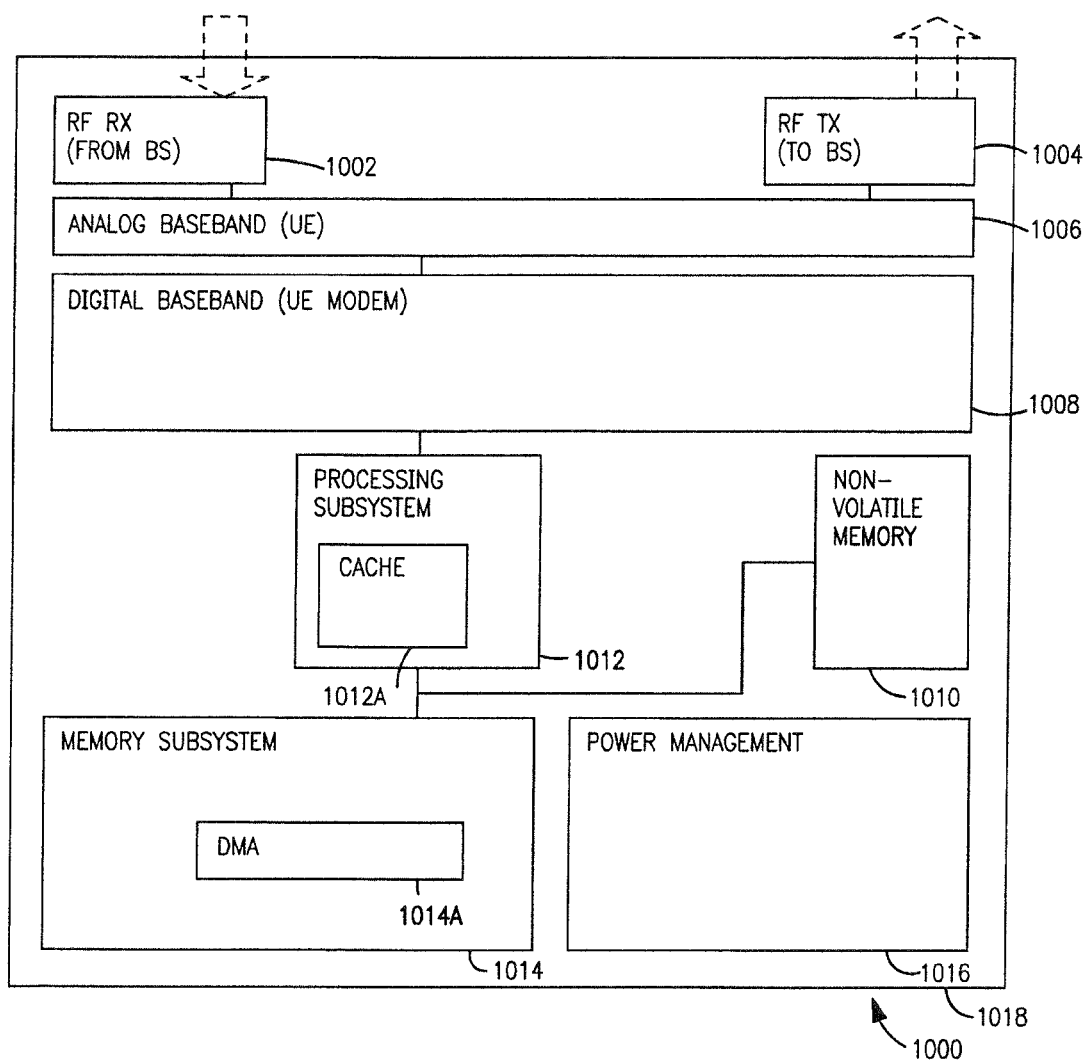
FIG. 10A is a block diagram illustrating one embodiment of a receiver (e.g., UE) apparatus according to the present invention.

FIG. 10A illustrates an exemplary client or receiver apparatus 1000 useful in implementing the methods of the present invention. The receiver apparatus disclosed may comprise, inter alia, a UE such as a cellular telephone, PDA, portable computer or other mobile communications device capable of operating within, for example, an OFDMA network.

The UE apparatus 1000 comprises an application processor subsystem 1012 such as a digital signal processor, microprocessor, field-programmable gate array, or plurality of processing components mounted on one or more substrates 1018. The processing subsystem may also comprise an internal cache memory 1012A. The processing subsystem 1012 is connected to a memory subsystem comprising memory 1014 which may for example, comprise SRAM, FLASH and SDRAM components. The memory subsystem may implement one or a more of DMA type hardware 1014A, so as to facilitate data accesses as is well known in the processor arts.

The radio/modem subsystem comprises a digital baseband 1008, analog baseband 1006, RX frontend 1002 and TX frontend 1004. While a specific architecture is discussed with respect to the illustrated embodiment, in other embodiments some components may be obviated or may otherwise be merged with one another (such as RF RX, RF TX and ABB combined, as of the type used for 3G digital RFs) as would be readily appreciated by one of ordinary skill in the art given the present disclosure.

In one embodiment, during operation, an exemplary UE digital baseband modem 1008 receives a schedule instructing the UE to change modes between interference cancellation operations for previously partially interference cancelled, and non-interference cancelled modes. The digital baseband modem fetches the configuration from the memory subsystem; in one variant, the schedules are pre-stored in non-volatile storage 1010 and loaded to the volatile memory subsystem during modem operation. The schedules are used by the digital baseband modem to appropriately schedule appropriate interference cancellation compensation according to the methods previously described herein (e.g., FIG. 9). In another variant, since the SINR varies over the frame depending on the current level of interference reduction of the relevant OFDM symbols/carriers when interference suppression is applied. The UE decodes the signals exploiting the knowledge of the exact SINR level on each carrier/OFDM symbol. This impacts the Maximum-Likelihood-Decoding calculation. Specifically, two cases are considered:

1) Legacy UE—The legacy UE inherently assumes that the SINR is constant over the whole frame (it is not aware that partial interference suppression is applied). The interference suppression will thus not achieve its full potential, since the SINR estimates used in the Maximum Likelihood (or similar) detection/decoding algorithm are not correct over the carriers where interference reduction is applied. Nonetheless, the performance gain under such circumstances is significant as compared to the case without interference reduction applied.

2) Non-legacy UE—The non-legacy UE adapted for interference reduction according to the invention knows where interference reduction is applied, and will use the optimum SINR values for each carrier/OFDM symbol for the Maximum Likelihood (or similar) decoder. Then, the maximum performance of the scheme is achieved.

The Analog Baseband 1006 controls operation of the radio frontends and converts a digital signal (input from the digital baseband modem 1008) to an analog representation for transmission. Therefore, the digital baseband modem loads the analog baseband, with scheduling parameters for the upcoming frame. The control of TX and RX frontends are also controlled by the analog baseband 1006.

The illustrated power management subsystem (PMS) 1016 provides power to the UE, and may comprise an integrated circuit and or a plurality of discrete electrical components. In one exemplary portable UE apparatus, the power management subsystem interfaces with a battery.

Exemplary Serving Base Station Apparatus—

Figure 10B:
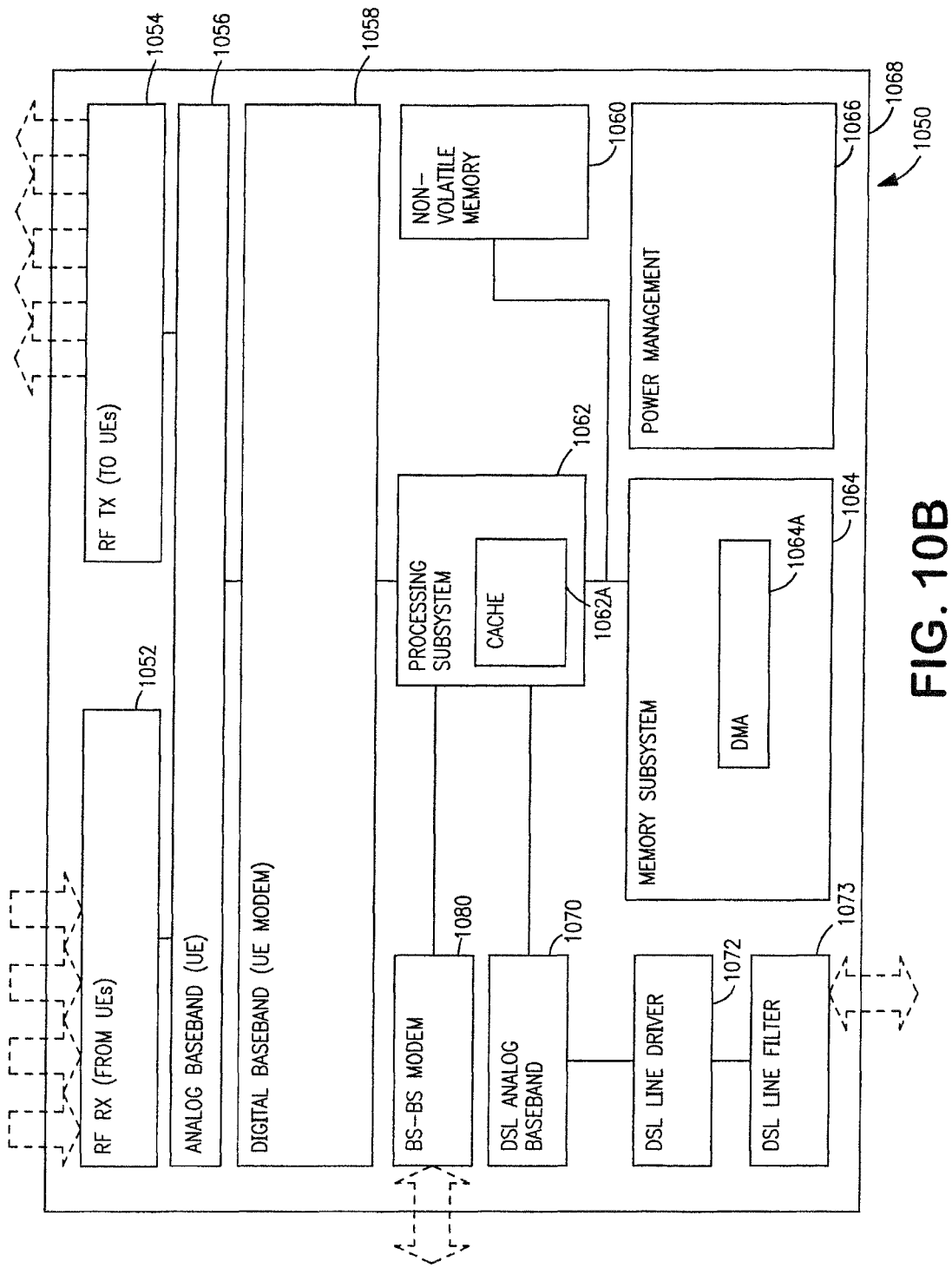
FIG. 10B is a block diagram illustrating one embodiment of a serving base station apparatus according to the present invention.

Referring now to FIG. 10B, one embodiment of a serving base station apparatus 1050 useful in implementing the methods of the present invention is illustrated. It will be appreciated that the base station apparatus of the invention may take the form of or be integrated with or within literally any type of wireless transmitter, such as e.g., a cellular macrocell (i.e., fully capable fixed cellular network base station), or a fixed or portable femtocell or other such less capable device (assuming adequate intra-cell communication channels exist).

In the illustrated embodiment, the base station apparatus 1050 comprises one or more substrate(s) 1068 (e.g., a plug-in card or the like) that further include a plurality of integrated circuits including a processing subsystem 1062 such as a digital signal processor (DSP), microprocessor, gate array, or plurality of processing components as well as a power management subsystem 1066 that provides power to the base station 1050.

The embodiment of the apparatus 1050 shown in FIG. 10B at a high level comprises a broadcasting circuit configured to broadcast within, for example, an OFDMA network, and which can switch between partial interference cancellation modes and non-interference cancelling modes if desired. The broadcasting subsystem comprises a digital baseband 1058, analog baseband 1056, and RF components for RX 1052 and TX 1054.

The processing subsystem 1062 may comprise a plurality of processors (or multi-core processor(s)). Additionally, the processing subsystem also may include a cache memory 1062A to facilitate processing operations.

In the disclosed embodiment, interference cancellation techniques may be implemented in software, firmware or hardware which is coupled to the processing subsystem. Alternatively, in another variant, the operations may be directly performed at the radio subsystem.

The processing subsystem 1062 is preferably connected to a memory subsystem 1064. The memory subsystem comprises a direct memory access (DMA) 1064A. Additionally the non-volatile memory 1060 may be incorporated within the memory subsystem 1064, or be separated (as shown).

The apparatus 1050 also preferably implements a connection (e.g. IPsec VPN tunnel or the like) to the core network. In one embodiment, this is accomplished via the broadband access subsystem (e.g., a DSL connection). This may comprise an analog baseband 1070, a line driver 1072, and a line filter 1073.

Finally, the apparatus 1050 also preferably implements a connection to its neighboring BS. In one embodiment, this is accomplished via the broadband access subsystem (e.g., the previously described X2 connection), although any number of other interfaces (whether wired or wireless) may be used as well. These communication interfaces should also be configured such that they do not impart excessive latency, the latter which could adversely impact the latency of the system (i.e., if inter-BS communication of LS, preamble, or pilot tone schedules or related data is too slow).

Methods of Doing Business

In another aspect of the invention, various business models and methods of doing business relating the aforementioned partial interference reduction techniques and apparatus are envisaged.

Specifically, in one embodiment, subscribers of a given network operator's service may be given the opportunity to upgrade or enhance their service plan or package through availability of interference reduction capabilities, such as for additional consideration or as an incentive for a premium subscription. In practical terms, such as in the context of an LTE network, the subscriber's data rate when having partial interference reduction applied may be greater than that experienced without it; hence, the network operator might market this advantage as an accelerated (e.g., "turbo") service.

Advantageously, this capability could be applied to legacy devices as well as upgraded ("split" mode) devices, described below, without any modification to the legacy devices.

In another business model, the aforementioned split-mode devices (i.e., those which also conduct a portion of the interference reduction processing at the UE itself; see e.g., FIGS. 9 and 9A) could be offered as a premium feature, such as for additional consideration or as an incentive. These non-legacy devices would ostensibly have an even greater data rate (assuming interference reduction was applied, and the receiver was conducting its interferer suppression algorithm) than that available in the legacy (non-split mode) devices described above.

As yet another business model, users might be given the opportunity to differentiate their services based on mobility. For example, as previously discussed, the rate or "density" of pilot tones is adapted based on the mobility context (i.e., low mobility versus high mobility). In the high mobility context, more frequent intra-BS communications are required (since CIR is presumed to change more rapidly), and also the density of pilot tones must be greater. These two additional requirements also impose greater processing and communication requirements on the network infrastructure. Hence, for users wanting the "accelerated" or turbo rates while traveling at high speed (e.g., while riding in their car, on a train, etc.), a premium could be charged.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method, comprising:
   at a base station of a multi-cell network comprising a plurality of base stations:
   receiving, from at least one other of the plurality of base stations of the multi-cell network, a transmission schedule for the at least one other base station; and
   scheduling transmissions for a mobile station connected to the base station based on the transmission schedule of the at least one other base station, wherein the scheduling comprises:
   negotiating at least one frame comprising at least one pilot tone to be transmitted to the mobile station by the base station based on signaling requirements of the mobile station, wherein the at least one other base station transmits a further pilot tone in a portion of the at least one frame comprising the at least one pilot tone at a first power level;
   transmitting the at least one pilot tone to the mobile station at a second power level that is greater than the first power level; and
   mitigating interference at the mobile station connected to the base station.

2. The method of claim 1, wherein the transmission schedule is received via an X2 communication link between the base station and the at least one other base station.

3. The method of claim 1, wherein a first coverage area of the base station partially overlaps a second coverage area of the at least one other base station.

4. The method of claim 1, wherein a first coverage area of the at least one other base station completely overlaps a second coverage area of the base station.

5. The method of claim 1, wherein the multi-cell network is one of a Long Term Evolution (LTE) network or an LTE Advanced (LTE-A) network.

6. The method of claim 1, wherein the at least one other base station is a plurality of other base stations and the scheduling is based on the transmission schedule of each of the other base stations.

7. The method of claim 1, wherein the base station is one of a macrocell or a femtocell.

8. The method of claim 1, wherein the base station transmits to the mobile station using one of frequency division duplexing (FDD) or time division duplexing (TDD).

9. A base station, comprising:
- a wireless interface configured to communicate with a mobile station connected to the base station;
- a network interface configured to communicate with at least one other base station of a multi-cell network including the base station; and
- a processor configured to receive, via the network interface, a transmission schedule for the at least one other base station, schedule transmissions for the mobile station connected to the base station based on the transmission schedule of the at least one other base station, wherein the scheduling comprises:
  - negotiating at least one frame comprising at least one pilot tone to be transmitted to the mobile station by the base station based on signaling requirements of the mobile station, wherein the at least one other base station transmits a further pilot tone in a portion of the at least one frame comprising the at least one pilot tone at a first power level;
  - transmitting the at least one pilot tone to the mobile station at a second power level that is greater than the first power level; and
  - mitigating interference at the mobile station connected to the base station.

10. The base station of claim 9, wherein the network interface is an X2 communication link.

11. The base station of claim 9, wherein a first coverage area of the base station partially overlaps a second coverage area of the at least one other base station.

12. The base station of claim 9, wherein a first coverage area of the at least one other base station completely overlaps a second coverage area of the base station.

13. The base station of claim 9, wherein the multi-cell network is one of a Long Term Evolution (LTE) network or an LTE Advanced (LTE-A) network.

14. The base station of claim 9, wherein the at least one other base station is a plurality of other base stations and the scheduling is based on the transmission schedule of each of the other base stations.

15. The base station of claim 9, wherein the base station is one of a macrocell or a femtocell.

16. The base station of claim 9, wherein the base station transmits to the mobile station using one of frequency division duplexing (FDD) or time division duplexing (TDD).

17. A method, comprising:
- at a base station of a multi-cell network comprising a plurality of base stations:
  - generating a transmission schedule for transmissions by the base station;
  - communicating the schedule to at least one other of the plurality of base stations, wherein the at least one other base station uses the schedule to schedule transmissions to a connected mobile station, wherein the scheduling comprises:
    - negotiating at least one frame comprising at least one pilot tone to be transmitted to the mobile station by the base station based on signaling requirements of the mobile station, wherein the at least one other base station transmits a further pilot tone in a portion of the at least one frame comprising the at least one pilot tone at a first power level;
    - transmitting the at least one pilot tone to the mobile station at a second power level that is less than the first power level; and
    - mitigating interference at the mobile stations connected to the at least one other base station.

18. The method of claim 17, wherein the transmission schedule is communicated via an X2 communication link between the base station and the at least one other base station.

19. The method of claim 17, wherein a first coverage area of the at least one other base station one of completely overlaps or partially overlaps a second coverage area of the base station.

20. The method of claim 17, wherein the multi-cell network is one of a Long Term Evolution (LTE) network or an LTE Advanced (LTE-A) network.

* * * * *

UNITED STATES PATENT AND TRADEMARK OFFICE
CERTIFICATE OF CORRECTION

PATENT NO. : 10,785,783 B2
APPLICATION NO. : 14/733606
DATED : September 22, 2020
INVENTOR(S) : Mueck et al.

Page 1 of 1

It is certified that error appears in the above-identified patent and that said Letters Patent is hereby corrected as shown below:

In the Claims

Claim 19, Column 30, Lines 40:
"of the at least one other base station one of completely" should read "of the at least one other base station completely."

Signed and Sealed this
Twenty-ninth Day of December, 2020

Andrei Iancu
*Director of the United States Patent and Trademark Office*